(12) United States Patent
Ajayan et al.

(10) Patent No.: US 9,312,078 B2
(45) Date of Patent: Apr. 12, 2016

(54) PATTERNED GRAPHITE OXIDE FILMS AND METHODS TO MAKE AND USE SAME

(75) Inventors: Pulickel M. Ajayan, Houston, TX (US); Bhabendra K. Pradhan, Marietta, GA (US); Wei Gao, Los Alamos, NM (US)

(73) Assignees: WILLIAM MARSH RICE UNIVERSITY, Houston, TX (US); NANOHOLDINGS, LLC, Rowayton, CT (US)

( * ) Notice: Subject to any disclaimer, the term of this patent is extended or adjusted under 35 U.S.C. 154(b) by 350 days.

(21) Appl. No.: 14/006,086

(22) PCT Filed: Mar. 18, 2011

(86) PCT No.: PCT/US2011/029095
§ 371 (c)(1),
(2), (4) Date: Dec. 2, 2013

(87) PCT Pub. No.: WO2012/128748
PCT Pub. Date: Sep. 27, 2012

(65) Prior Publication Data
US 2014/0120453 A1       May 1, 2014

(51) Int. Cl.
| | |
|---|---|
| *H01G 11/22* | (2013.01) |
| *H01G 11/52* | (2013.01) |
| *H01G 11/32* | (2013.01) |
| *C01B 31/04* | (2006.01) |
| *B01D 67/00* | (2006.01) |
| *B01D 69/06* | (2006.01) |
| *B01D 71/02* | (2006.01) |
| *B01D 61/48* | (2006.01) |
| *H01M 8/10* | (2006.01) |

(Continued)

(52) U.S. Cl.
CPC .............. *H01G 11/52* (2013.01); *B01D 61/485* (2013.01); *B01D 67/009* (2013.01); *B01D 67/0093* (2013.01); *B01D 69/06* (2013.01); *B01D 71/021* (2013.01); *B01D 71/024* (2013.01); *C01B 31/043* (2013.01); *H01G 11/32* (2013.01); *H01M 8/1016* (2013.01); *B01D 2325/08* (2013.01); *B01D 2325/26* (2013.01); *H01G 4/33* (2013.01); *H01G 9/04* (2013.01); *Y02E 60/13* (2013.01); *Y10T 156/10* (2015.01)

(58) Field of Classification Search
CPC ......... H01G 9/04; H01G 9/042; H01G 9/048; H01G 9/058; H01G 9/145; H01G 11/22; H01G 11/24; H01G 11/26; H01G 11/30; H01G 11/32; H01G 11/36; H01G 11/42; H01G 2009/0007
USPC ......................................................... 361/502
See application file for complete search history.

(56) References Cited

U.S. PATENT DOCUMENTS

| | | |
|---|---|---|
| 4,796,701 A | 1/1989 | Hudson et al. |
| 6,303,499 B1 | 10/2001 | Sato |

(Continued)

OTHER PUBLICATIONS

International Search Report and Written Opinion for PCT/US2011/029095, mailed on Jun. 27, 2011.

(Continued)

*Primary Examiner* — Dion R Ferguson
(74) *Attorney, Agent, or Firm* — Winstead PC

(57) ABSTRACT

The present invention relates to patterned graphite oxide films and methods to make and use same. The present invention includes a novel strategy developed to imprint any required conductive patterns onto self-assembled graphene oxide (GO) membranes.

36 Claims, 28 Drawing Sheets

(51) Int. Cl.
H01G 9/04 (2006.01)
H01G 4/33 (2006.01)

(56) References Cited

U.S. PATENT DOCUMENTS

| | | | |
|---|---|---|---|
| 7,658,901 | B2 | 2/2010 | Prud'Homme et al. |
| 2009/0252891 | A1 | 10/2009 | Hirata et al. |
| 2010/0021708 | A1 | 1/2010 | Kong et al. |
| 2010/0221508 | A1 | 9/2010 | Huang et al. |
| 2010/0255984 | A1 | 10/2010 | Sutter et al. |
| 2010/0273060 | A1 | 10/2010 | Yang et al. |
| 2010/0303706 | A1 | 12/2010 | Wallace et al. |
| 2011/0053805 | A1 | 3/2011 | Riedo et al. |
| 2012/0026643 | A1* | 2/2012 | Yu .......... H01G 11/02 361/502 |
| 2012/0170171 | A1* | 7/2012 | Lee .......... H01G 11/36 361/502 |
| 2014/0098461 | A1* | 4/2014 | Zhamu .......... H01G 11/36 361/502 |

OTHER PUBLICATIONS

International Preliminary Report on Patentability for PCT/US2011/029095, mailed on Sep. 24, 2013.
Mativetsky et al., Local Current Mapping and Patterning of Reduced Graphene Oxide, J. Am. Chem. Soc., 2010, 132 (40), pp. 14130-14136.
Cai et al., "Synthesis and solid-state NMR structural characterization of "C-labeled graphite oxide." Science, 2008, 321, 1811-1817.
Casablanca, L. B., et al., "NMR-based structural modeling of graphite oxide using multidimensional nC Solid-State NMR and ab Initio chemical shift calculations," J. Am. Chem. Soc, 2010, 132, 5672-5676.
Cerveny, S., et al., "Dynamics of Water Intercalated in Graphite Oxide." J. Phy. Chem. C, 2010, 114, 2604-2612.
Chmiola, J., et al., "Monolithic Carbide-Derived Carbon Films for Micro-Supercapacitors" Science, 2010, 328, 480-483.
Punckt, C, et al., "Electrochemical performance of graphene as effected by electrode porosity and graphene functionalization," Electroanalysis 2010, 22, No. 23, 2834-2841.
Gao, W. et al., "New insights into the structure and reduction of graphite oxide," Nat. Chem., 2009, 1, 403-408.
Gilje, S., et al., "A chemical route to graphene for device applications," Nano Lett, 2007, 7, 3394-3398.
Hummers et al., "Preparation of Graphitic Oxide," J. Am. Chem. Soc, 1958, 80, 1339.
Jung et al., "Tunable Electrical Conductivity of Individual Graphene Oxide Sheets Reduced at Low Temperatures", Nano Letters, 2008, 8, (12), 4283-4287.
Park et al., "Aqueous suspension and characterization of chemically modified graphene sheets", Chem. Mater., 2009, 20, 6592-6594.
Pech et al., "Ultrahigh-power micrometre-sized supercapacitors based on onion-like carbon", Nat. Nanotech., 2010, 5, 651-654.
Thampan, et al., "Modeling of conductive transport in proton-exchange membranes for fuel cells," J. Electrochem. Soc., 2000, 147, 3242-3250.
Wei et al., "Nanoscale tunable reduction of graphene oxide for graphene Electronics," Science, 2010, 328, 1373-1375.
Xu et al., "Flexible graphene films via the filtration of water-soluble noncovalent functionalized graphene sheets," Journal of the American Chemical Society, 2008, 10, (18), 5856.
Stoller, M. D., et al., "Graphene-based ultracapacitors," Nano Lett., 2008, 8, 3498-3502.
Yoo et al., Ultrathin Planar Graphene Supercapacitors, Nano Lett., 2011, 11 (4), pp. 1423-1427.
Abraham, K. M., et al., "Highly conductive PEO-like polymer electrolytes," Chem. Mater., 1997, 9, 1978-1988.
Agmon, K, "The Grotthuss Mechanism," Chem. Phys. Lett., 1995, 244, 456-462.
Balducci, et al., "Cycling stability of a hybrid activated carbon// poly(3-methylthiophene) supercapacitor with N-butyl-N-methylpyrrolidinium bis(trifluoromethanesulfonyl)imide ionic liquid as electrolyte," Electrochim. Acta, 2005, 50, 2233-2237.
Chen et al., "High performance supercapacitors based on reduced graphene oxide in aqueous and ionic liquid electrolytes", Carbon, 2011, 49, 573-580.
Eda, et al., "Chemically derived graphene oxide: Towards Large-Area Thin-Film Electronics and Optoelectronics", Adv. Mater, 2010, 22, 2392-241 5.
Eda et al., "Large-area ultrathin films of reduced graphene oxide as a transparent and flexible electronic material," Nat. Nanotech., 2008, 3, 270-274.
Hirata et al., "Thin-film particles of graphite oxide. 2: Preliminary studies for internal micro fabrication of single particle and carbonaceous electronic circuits", Carbon, 2005, 43, 503-5.
Kim et al., "Sulfonated poly(ether ether ketone) membranes for electric double layer capacitors" Electrochimica Acta, 2008, 53,(12), 4331-4335.
Liu et al., "All-solid-state electric double-layer capacitor with isotropic high-density graphite electrode and polyethylene oxide/LiClO4 polymer electrolyte", J. Electrochem. Soc., 1996, 143, 3982-3986.
Mauritz, K. A., et al., "State of understanding of Nafion." Chem. Rev., 2004, 104, 4535-4585.
Park et al., "All-solid-state supercapacitor using a Nafion® polymer membrane and its hybridization with a direct methanol fuel cell," J. Power Sources, 2002, 109, 500-506.
Pech et al., "Elaboration of a microstructured inkjet-printed carbon electrochemical capacitor," J. Power Sources, 2009, 195, 1266-1269.
Petit et al., "Revisiting the chemistry of graphite oxides and its effect on ammonia adsorption" J. Mater. Chem., 2009, 19, 9176-9185.
Rikukawa et al., "Proton-conducting polymer electrolyte membranes based on hydrocarbon polymers," Prog. Poly . Sci., 2000, 25, 1463-1502.
Saito et al., "Mechanisms of ion and water transport in perfluorosulfonated ionomer membranes for fuel cells," J. Phys. Chem. B, 2004, 108, 16064-16070.
Taberna et al., "Electrode surface treatment and electrochemical impedance spectroscopy study on carbon/carbon supercapacitors," Appl. Phys. and Mater. Sci., 2006, 82, 639-646.
Tung et al., "High-throughput solution processing of large-scale graphene," Nat. Nanotech., 2009, 4, 25-29.
J Wang et al., "Ternary self-assembly of ordered metal oxide-graphene nanocomposites for electrochemical energy storage," Acs Nano, 2010, 4, 1587-1595.
Wang et al., "Supercapacitor Devices Based on Graphene Materials," Journal of Physical Chemistry C, 2009, 113, (30), 13103-13107.
Williams et al., "Ti02-graphene nanocomposites: UV-assisted photocatalytic reduction of graphene oxide," Acs Nano, 2008, 2 (7), 1487-1491.
Zhang, Y. L., et al . "Direct imprinting of microcircuits on graphene oxides film by femtosecond laser reduction," Nano Today, 2009, 5, 15-20.

\* cited by examiner

PATTERNED GRAPHITE OXIDE FILMS AND METHODS TO MAKE AND USE SAME

FIELD OF INVENTION

The present invention relates to patterned graphite oxide films and methods to make and use same.

SUMMARY OF THE INVENTION

The present invention involves a new method to prepare novel membranes incorporated with all kinds of conductive patterns that are useful in energy-storage, microelectronics and water-purification applications. The present invention includes the methods, the membranes (or films), and their uses.

In general, in one aspect, the invention features a method that includes selecting a graphite oxide membrane with the graphite oxide membrane being a free-standing graphite oxide membrane. The method further includes forming a pattern on the graphite oxide membrane to form a patterned graphite oxide membrane. The pattern is formed by reducing a portion of the graphite-oxide membrane to conducting reduced graphite oxide. The method further includes forming a device that includes the patterned graphite oxide membrane.

Implementations of the invention can include one or more of the following features:

A laser can be used to reduce the graphite-oxide membrane to conducting reduced graphite oxide.

The laser can be a $CO_2$ laser

The graphite-oxide membrane can be reduced to conducting reduced graphite oxide using one or more of the following techniques: laser heating, controllable UV-irradiation, and hot AFM tip scanning.

The patterned graphite oxide membrane can be a reduced graphite oxide-graphite oxide-reduced graphite oxide patterned graphite oxide membrane.

The patterned graphite oxide membrane can have an in-plane geometry.

The in-plane geometry can be a column geometry, a concentric circle geometry, a hairbrush geometry, or a combination thereof.

The patterned graphite oxide membrane can have a sandwich geometry.

The step of forming the device can include cutting a pattern from tape, which pattern of tape is the same as the pattern of the patterned graphite oxide membrane.

The step of forming the device can include operably affixing the tape to the patterned graphite oxide membrane.

The tape can be copper tape, polyvinyl tape, or carbon-coated aluminum tape or a combination thereof.

The tape can be a current collector tape.

The tape can be an electrical contact tape.

The graphite oxide can be prepared using a modified Hummers method.

The device can be operable for electrochemical performance without the use of any external electrolyte.

The device can be a supercapacitor device.

The device can be operable in a separator/electrolyte membrane system.

The method can be scalable.

The method can be scalable to write micro-supercapacitors on the graphite oxide.

The method can make a two-dimensional pattern with a one-step laser-printing technique.

The device can be operable in an energy storage device application, an energy storage capacitor application, electronics application, water purification application, or a combination thereof.

The method can further include using the device in an energy storage device application, an energy storage capacitor application, an electronics application, a water purification application, or a combination thereof.

In general, in another aspect, the invention features a device that includes a patterned graphite oxide membrane. The pattern on the patterned graphite oxide membrane is conducting reduced graphite oxide.

Implementations of the invention can include one or more of the following features:

The patterned graphite oxide membrane can be a reduced graphite oxide-graphite oxide-reduced graphite oxide patterned graphite oxide membrane.

The patterned graphite oxide membrane can have an in-plane geometry.

The in-plane geometry can be a column geometry, a concentric circle geometry, a hairbrush geometry, or a combination thereof.

The patterned graphite oxide membrane can have a sandwich geometry.

The device can further include a patterned tape. The pattern of the patterned tape can be the same as the pattern of the patterned graphite oxide membrane.

The tape can be operably affixed to the patterned graphite oxide membrane.

The tape can be copper tape, polyvinyl tape, or carbon-coated aluminum tape or a combination thereof.

The tape can be a current collector tape.

The tape can be an electrical contact tape.

The device can be operable for electrochemical performance without the use of any external electrolyte.

The device can be a supercapacitor device.

The device can be a micro-supercapacitor device.

The device can be operable in a separator/electrolyte membrane system.

The device can be operable in an energy storage device application, an energy storage capacitor application, electronics application, water purification application, or a combination thereof.

The device can be an energy storage device, an energy storage capacitor device, an electronic device, a water purification device, or a combination thereof.

The device can have been formed from the any of the above methods.

In general, in another aspect, the invention features a method of using any of the above devices in various applications.

The method of using any of the above devices can include in an energy storage device application, an energy storage capacitor application, an electronics application, a water purification application, or a combination thereof.

BRIEF DESCRIPTION OF THE DRAWINGS

For a detailed description of the preferred embodiments of the invention, reference will now be made to the accompanying drawings in which:

FIG. 4A shows a scan rate dependence in cyclic voltammetry measurement for in-plane structure.

FIG. 4B shows a scan rate dependence in cyclic voltammetry measurement for sandwich structure.

FIG. 4C is an SEM image showing the interface between GO and RGO in the films. FIG. 4D is a schematic of the proposed microstructure and chemical structure of the interface.

FIG. 7 shows a stepwise change in impedance spectra versus exposure time to vacuum. FIG. 8 shows a dependence of ionic conductivity on exposure time to vacuum and air. FIG. 9 is a schematic of the chemical structure showing the measured physical properties of hydrated GO.

FIG. 14A shows a cross-sectional image of the interface between Hydrated GO and RGO, from the thickness measurement, around 7.5% of Hydrated GO thickness is reduced (scale bar: 100 μm). FIG. 14B shows a zoom-out image of FIG. 14A, (scale bar: 500 μm) The spacing between two parallel RGO parts is measured to be 0.37 mm.

DETAILED DESCRIPTION

Figure 1:
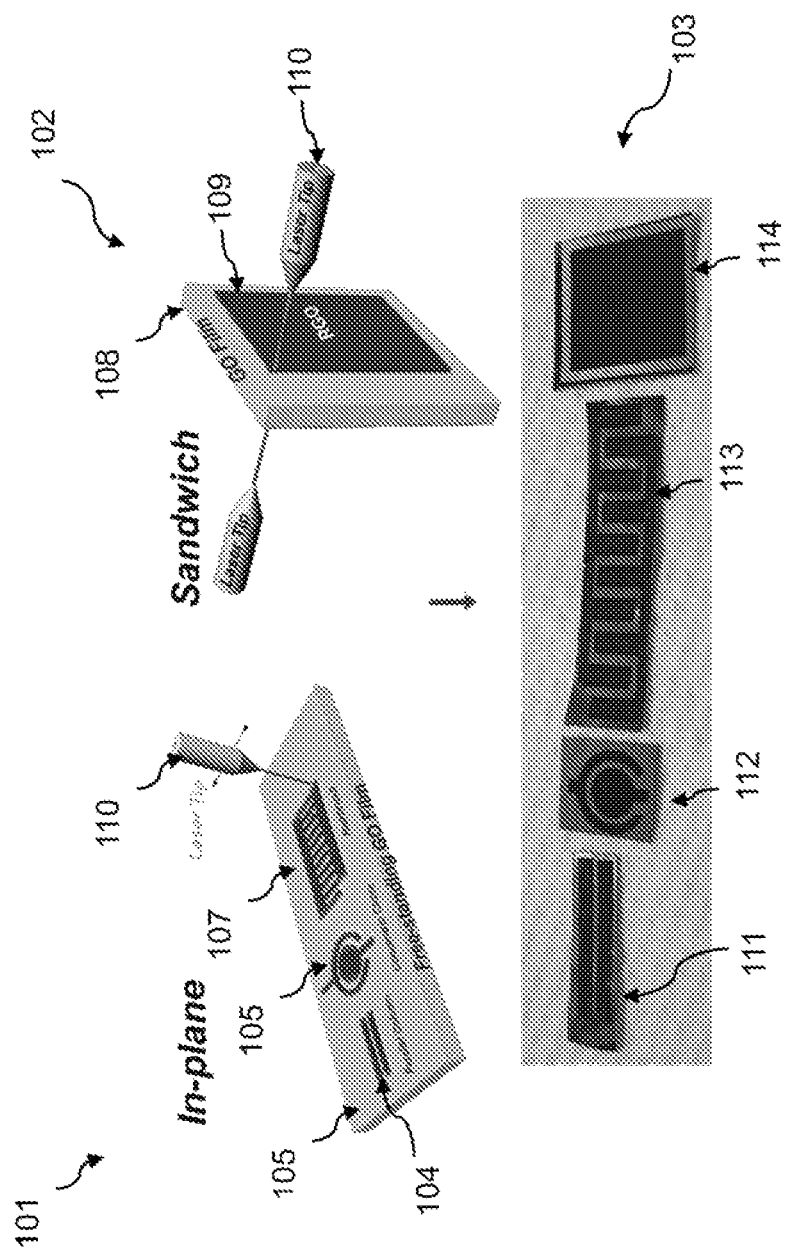
FIG. 1 are schematics showing the $CO_2$ laser patterning of free-standing hydrated GO films to fabricate the RGO-GO-RGO devices with in-plane and sandwich geometries.

The present invention relates to patterned graphite oxide films and methods to make and use same. The present invention includes a novel strategy developed to imprint any required conductive patterns onto self-assembled graphite oxide (GO) membranes. GO is single or few layers of graphite with various oxygen-containing groups on its surface, rendering it soluble in water. [Gao 2009] Free-standing GO films with thicknesses ranging from 2.5 μm to 50 μm, could be easily fabricated, by either vacuum filtration or solvent evaporation of GO solution. [Xu 2008]. Due to its unique nature, GO can be partially reduced back to graphite with different routes such as chemical reduction [Gilje 2007], thermal annealing [Jung 2008], or UV-irradiation [Williams 2008]. Along with its reduction, the electrical conductivity evolves stepwise from electrically insulating to conducting as well as graphite. The $CO_2$ laser-printer is employed to partially and controllably reduce GO membrane by laser-beam heating. The resulting patterns can be used as capacitor devices after electrical contacts are made.

Electrochemical characterization shows a specific capacitance at levels as high as: about 0.51 mF/cm$^2$ (as prepared), 1.6 mF/cm$^2$ (with $Na_2SO_4/H_2O$), and 2.7 mF/cm$^2$ with organic electrolyte (1 M TEA BF$_4$). The recyclability of the as-made cell has been tested with over 10,000 cycles with 70.8% retaining of initial capacitance.

Embodiments of the present invention provide a scalable way to directly write reduced graphite oxide (RGO) on graphite oxide (GO) films to assemble arrays of RGO-GO-RGO based supercapacitor devices [Liu 1996; Ritkukawa 2000] by laser reduction and patterning. The fabrication and utility of the approach is greatly facilitated by the discovery that GO [Hummers 1958; Gilje 2007; Gao 2009; Cerveny 2010] prepared by the wet oxidation of graphite powder [Hummers 1958: Gilje 2007] is a good solid electrolyte, allowing the use of the as patterned devices without (or with) any external electrolytes. The substantial amount of entrapped water in the layered GO structure [Cerveny 2010] makes it a strongly anisotropic ionic conductor but an electrical insulator, allowing its use as a viable electrolyte and electrode separator. The hydrated GO exhibits similar proton transport characteristics as the well-known solid electrolyte membrane, Nafion. [Thampan 2000; Park 2002]. The micro-supercapacitor devices fabricated here constitute a new type of all carbon monolithic supercapacitors showing good cyclic stability and energy storage capacity in comparison to existing thin film supercapacitors. [Chmiola 2010].

GO has attracted attention since it offers a low-cost, scalable and wet-chemical approach to graphene. [Eda 2008; Tung 2009; Eda 2010, Cai 2008; Casablanca 2010]. The conductivity of GO depends on its surroundings and varies from 5E-6 S/cm to 4E-3 S/cm [Gao 2009, Park 2009] suggesting that GO is close to electrically insulating. With water entrapped during processing or absorbed on exposure to environment or moisture, it has been found that hydrated GO offers very interesting applications in energy storage devices. The ability to laser reduce GO into conducting RGO allows the facile and nontoxic writing of RGO-GO-RGO patterns in various configurations to build electrical double layer capacitors (EDLC) or supercapacitors.

Recent reports describe the laser reduction process of GO into RGO with various levels of reduction and electrical conductivity improvements. [Wei 2010; Zhang 2009]. The present invention provides patterning any GO surface into RGO-GO-RGO structures with micron resolution in various geometries. Both in-plane as well as conventional sandwich supercapacitor designs have been constructed, in various patterns and shapes as described in FIG. 1 and FIG. 2.

FIG. 1 are schematics showing the $CO_2$ laser patterning (with laser tip 107) of free-standing hydrated GO films (104 and 108) to fabricate the RGO-GO-RGO devices (111-114) with in-plane (101) and sandwich (102) geometries. The dark contrast (1105-07 and 109 (and a contrast on the other side of film 108, but hidden from view) in the schematics 101 and 102 correspond to RGO and the light contrast (104 and 108) to unmodified hydrated GO (also referred to as "free-standing GO film"). For in-plane devices, three different geometries were used (parallel column 105, concentric circle 106, and hairbrush 107), and the concentric circular pattern 106 gives the highest capacitance density. Bottom row of FIG. 1 (103) shows the photographs of patterned devices 111-113 (which correspond to patterns 105-107, respectively) and patterned device 114 (which correspond to pattern 109 and the unseen pattern on the other side of film 108).

Figure 2:
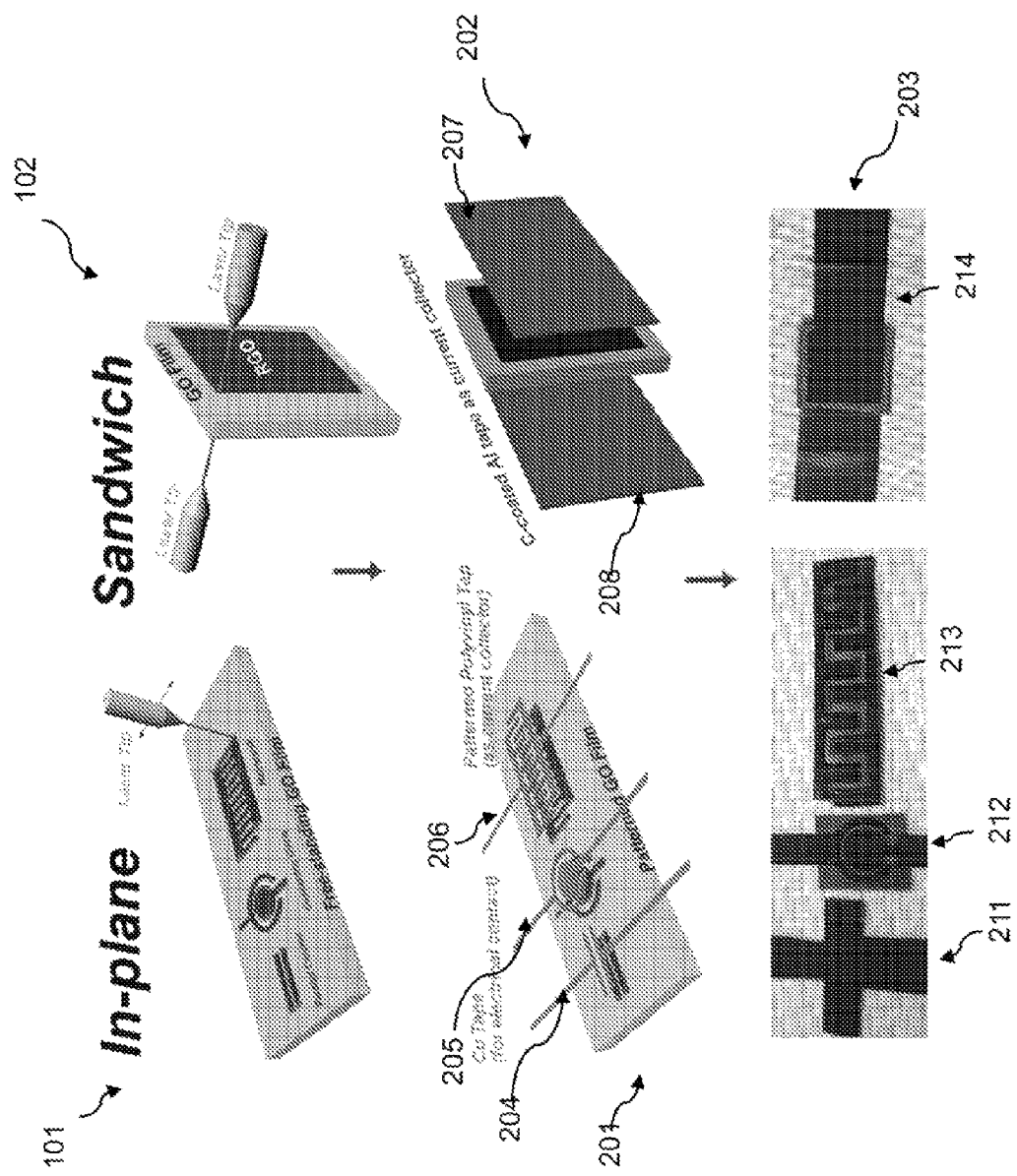
FIG. 2 are schematics showing the detailed fabrication process for RGO-GO-RGO supercapacitor devices with in-plane and sandwich geometries.

FIG. 2 are also schematics showing the detailed fabrication process for RGO-GO-RGO supercapacitor devices with in-plane and sandwich geometries. After laser patterning, the patterns were cut out from current collector tapes in the in-plane (201) and sandwich (202) geometries. As shown in FIG. 2, copper tape 204 and 205 (for electrical contact) was used for all the in-plane patterns, patterned polyvinyl tape 206 (as current collector) was used for the in-plane concentric circle 106 pattern, and carbon-coated aluminum tape 207 and 208 (as current collector for sandwich devices) was used for the pattern 109 and the unseen pattern on the other side of film 108, respectively. Bottom row of FIG. 2 (203) shows the photographs of patterned devices 211-213 (which correspond to patterns 105-107, respectively) and patterned device 214 (which correspond to pattern 109 and the unseen pattern on the other side of film 108), which include the respective tapes used.

Typical dimensions of the embodiments of the invention that have been fabricated are as follows: Parallel column: 1 cm by 1 mm with 0.3 mm spacing; concentric circular pattern: 3 mm diameter inner circle, 4 mm diameter separating circle, and 5 mm diameter outer circle; hairbrush: 2 cm by 5 mm rectangle with five 3.5 mm by 1.5 mm branches equally distributed on each brush; sandwich: 8 mm×8 mm square of RGO on both sides of a 1 cm×1 cm square of Hydrated GO film, the edge of the film is patterned to define the outer square on the original film, helping locate the center square on the other side.

Graphene oxide was prepared according to the modified Hummers methods. In detail, concentrated $H_2SO_4$ (50 ml), $K_2S_2O_8$ (10 g) and $P_2O_5$ (10 g) are mixed in a 2 L Erlenmeyer flask and heated to 80° C. with a hotplate, 12 g of graphite powder (purchased from Bay Carbon, Inc. SP-1 grade 325 mesh) is added to the mixture with strong magnetic stirring for 4.5 hours. After that, 2 L of demonized (DI) water is added to the suspension (initially, water is added very slowly to avoid large amount of heat from the dilution of $H_2SO_4$). After dilution, the mixture is left overnight and then filtered through a 0.1 micron Teflon Millipore membrane: the filter cake is allowed to dry in air overnight.

On the second day, the filter cake is slowly dispersed into 0.46 L concentrated $H_2SO_4$ in a 4 L Erlenmeyer flask in an ice bath with stirring. The temperature of the mixture is carefully controlled not exceeding 10° C. The dispersion is kept at 35° C. for 2 hours and then diluted with 900 ml of DI water. (Water should be added slowly to avoid rapid heating. During the whole process, the temperature is controlled below 50° C.) Subsequently 2.8 L of DI water is added over 2 hours with continuous stirring, giving a brownish dispersion. Immediately after finishing dilution, 50 ml of 30% $H_2O_2$ is slowly added to the dispersion, leading to tremendous bubbling as well as an obvious color change from brown to bright yellow. The mixture is left untouched for at least two days and then filtered through a 0.1 micron Millipore Teflon membrane, and washed with 10% HCl and 5 L DI water sequentially. The final filter cake is left to dry in air and then kept in desiccators with $P_2O_5$. The graphite oxide product can be easily dispersed in water by mild sonication.

To make free-standing films, GO were dispersed in DI water in a concentration of 6 mg/ml. The colloidal solution was sonicated in water bath for 1 hour to achieve homogeneous dispersion. For a typical film preparation, 50 ml of the dispersion was poured into a vacuum filtration setup, filtered under low vacuum for 3 days with a nitrocellulose membrane (0.2 μm, Millipore). The resulting film is around 22 μm in thickness, approximately 240 mg by weight, 8.7 cm in diameter, free-standing and flexible.

GO was prepared as reported in literature. [Gilje 2007] Free-standing GO films were made by vacuum filtration (supplementary information for details), and directly used for X-ray photoelectron spectroscopy (XPS, PHI Quantera) and X-ray diffraction (XRD, Rigaku/D, Cu Ka radiation) characterizations. Laser reduction was conducted with the $CO_2$ laser printer (Universal X-660 Laser Cutter Platform, power of 2.4 W, 30% scanning speed). Sheet resistivity was measured by a 4-point probe resistivity meter (Jandel RM3) with a fixed current of 1 μA in a clean room. SEM images of the as-prepared device were obtained on a high resolution field emission scanning electron microscope (FEI Quanta 400). Conductive polyvinyl tapes and carbon coated aluminum (Al) foils (from Exopack Advanced Coatings) were used as current collectors.

Cyclic Voltammogram (CV), Galvanostatic charge-discharge (GAL) and Electrochemical Impedance Spectroscopy (EIS) measurements were used to characterize the supercapacitor performance, with an Autolab workstation (PGSTAT302N). The aqueous electrolyte used was 1.0 M $Na_2SO_4$ (ACS grade) and the organic electrolyte was 1.0 M tetraethylammonium tetrafluoroborate ($TEABF_4$, electrochemical grade, >99%, Sigma Aldrich) in anhydrous acetonitrile (99.8%, Sigma Aldrich). Devices in organic electrolyte were assembled in Ar atmosphere in a dry glove box. The ionic conductivity of the pristine GO is determined from complex impedance spectra measured using the Autolab (PGSTST302N) with a frequency range from 1 MHz to 100 Hz. A conductivity cell containing two stainless steel blocking electrodes with an intact GO film was used for this measurement. [Abraham 1997] Silver (Ag) was sputter coated onto both surfaces of the GO film to improve the contact.

Figure 3A:
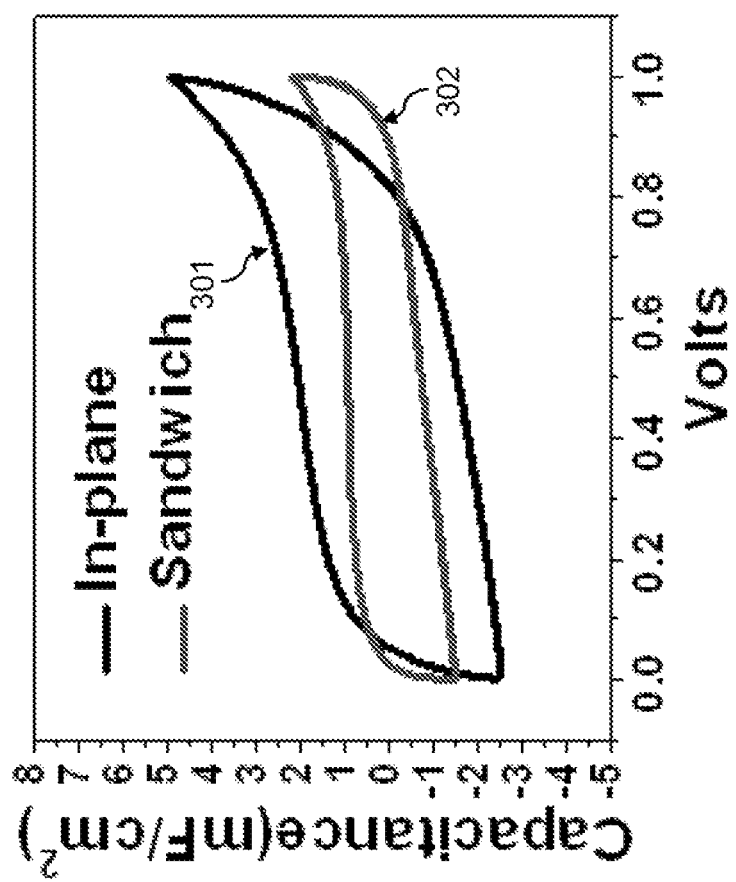
FIGS. 3A-3B show comparisons of CV and impedance behavior of the in-plane and sandwich devices.
Figure 3B:
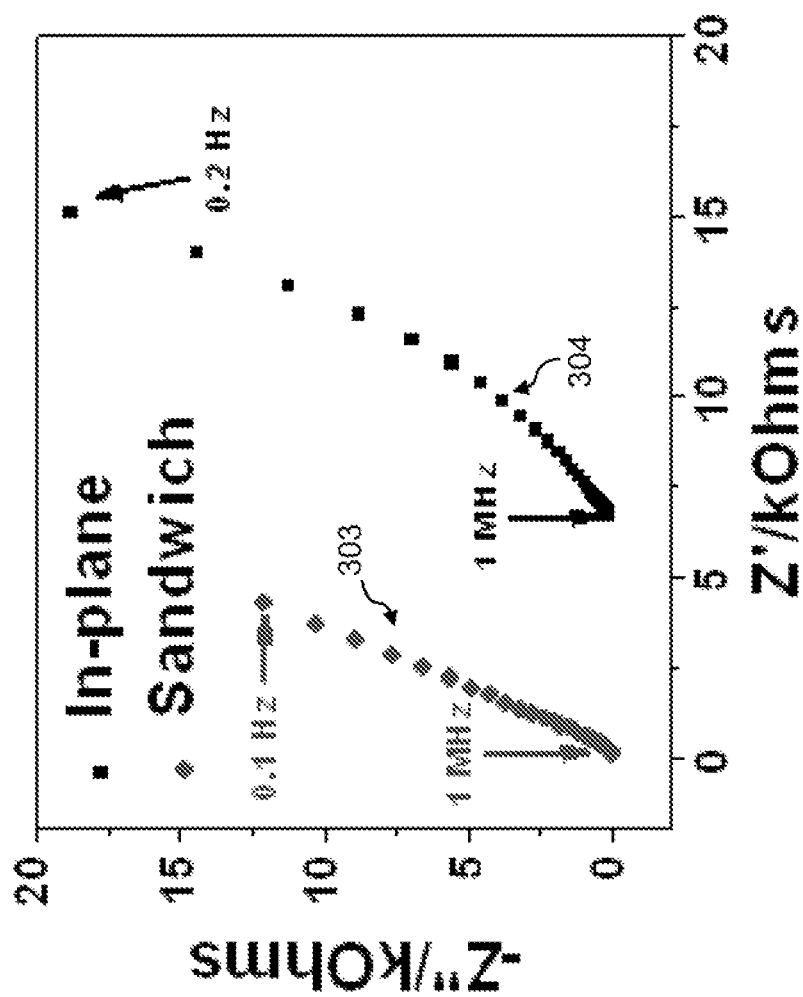

The configurations of supercapacitor, conventional sandwich-like configuration and novel in-plane configurations can be directly built on single piece of GO paper. Quite surprisingly, as shown in FIGS. 3A-3B, the as-prepared laser patterned devices (RGO-GO-RGO) showed good electrochemical performance without the use of any external electrolyte. The capacitance measured appeared to depend on the geometry of the design, as the ionic mobilities and transport distances (thickness of the separator section) were anisotropic and different for different geometries. FIG. 3A shows CV curves of in-plane circular (curve 301) and sandwich devices (curve 201) at a scan rate of 40 mV/s. The in-plane circular structure is giving specific capacitance twice as high as that of sandwich structure. Impedance spectra from 1 MHz to 10 mHz at 10 mV sinusoidal signal, zoomed in at the high frequency region, demonstrate much higher ESR value (the intercept of slanted straight line with the Z' axis) for the in-plane device than that of a sandwich, leading to lower power density of the in-plane device. The in-plane supercapacitor structure in a circular geometry was seen to give the highest capacitance (0.51 mF/cm$^2$), nearly twice as that of a sandwich structure.

The control experiment was done with pristine hydrated GO films and current collectors (having no reduced RGO part), and no capacitance was detectable. The equivalent series resistance (ESR) values obtained from the impedance spectra offers information about how fast the cells are charged/discharged. FIG. 3B shows an impedance spectra from 1MHz to 10 mHz at 10 mV sinusoidal signal, zoomed in at the high frequency region, demonstrating much higher ESR value (the intercept of slanted straight line with the Z' axis) for the in-plane device (curve 303) than that of a sandwich (curve 304), leading to lower power density of the in-plane device. The in-plane structure was found to have higher ESR value than the sandwich structure (6.5 kΩ versus 126Ω) as seen in FIG. 3B, indicating lower charge/discharge rate. (See FIGS. 3A-3B). In comparison, a well designed recently reported, inkjet-printed carbon supercapacitor, with inter-digitated electrode structure and similar electrode thickness, has a mean capacitance density of 0.4 mF/cm$^2$ with an organic electrolyte [Pech 2009 (APL calculation)], showing that the performance of the present invention device without external electrolyte was in the same range as reported for other systems. For electrochemical double-layer microcapacitors, typical capacitance values reported in literature fall between 0.4~2 mF/cm$^2$. [Pech 2010].

Figure 4A:
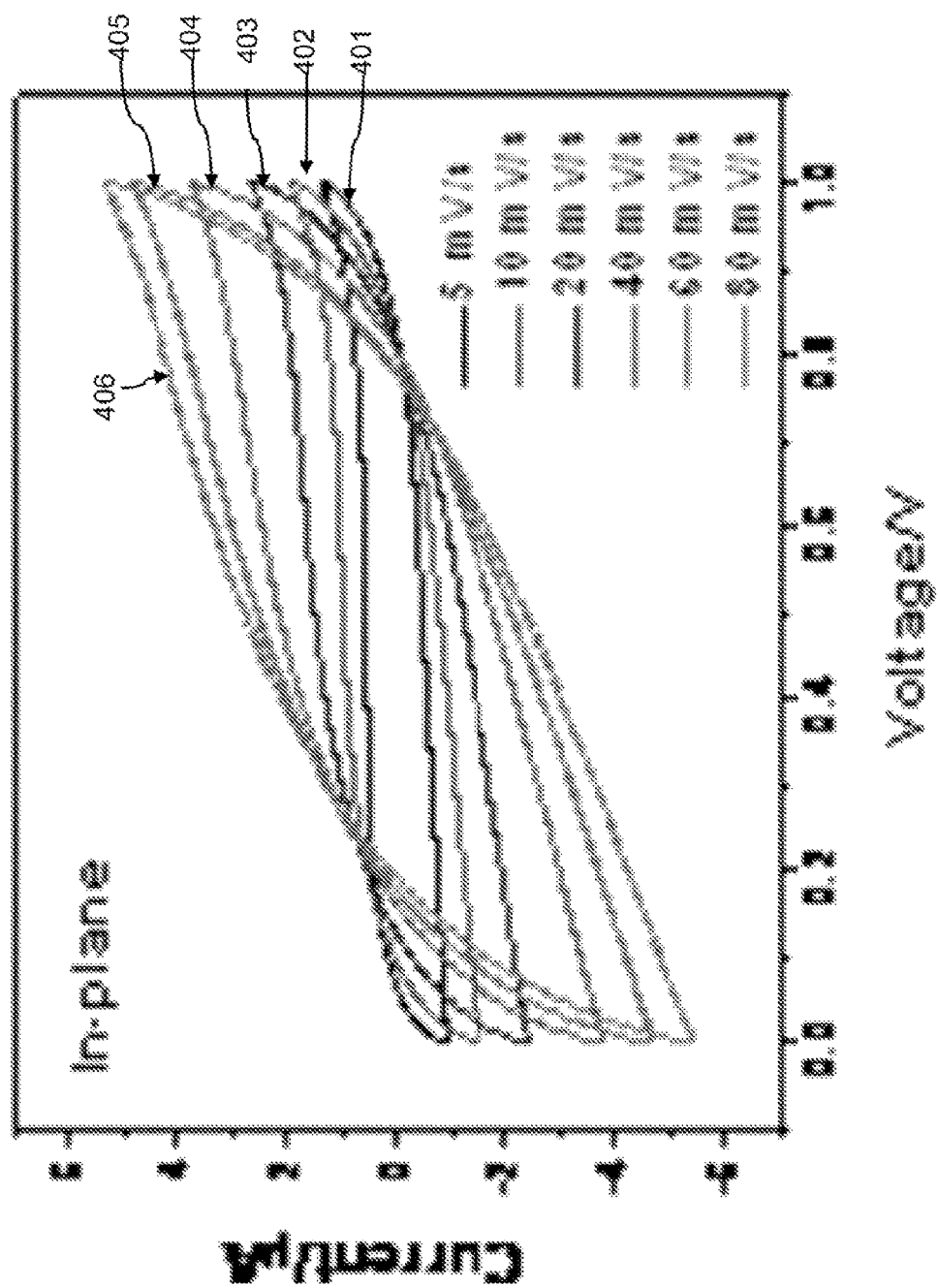
FIGS. 4A-4D shows a characterization of the device performance and microstructure.
Figure 4B:
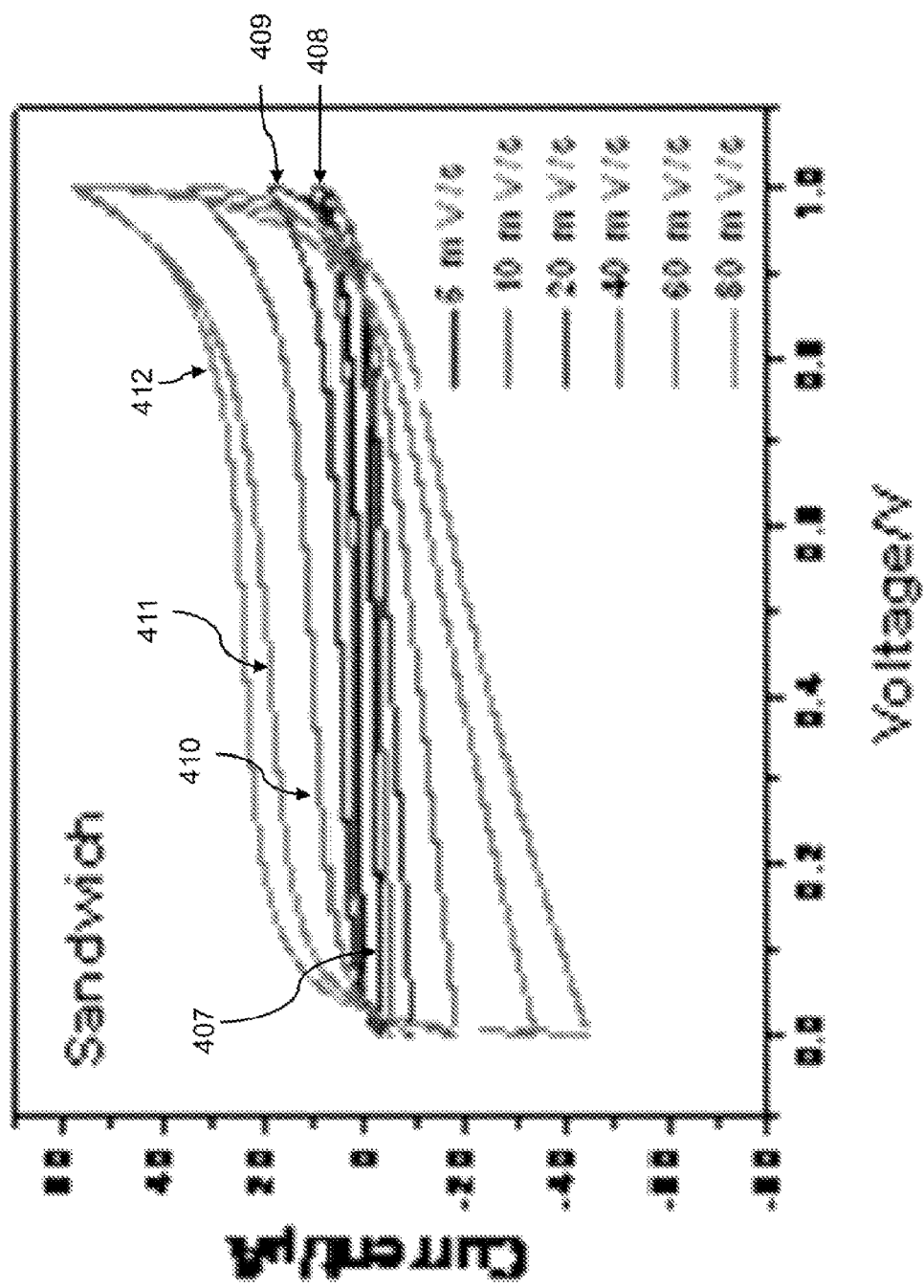
Figure 4C:
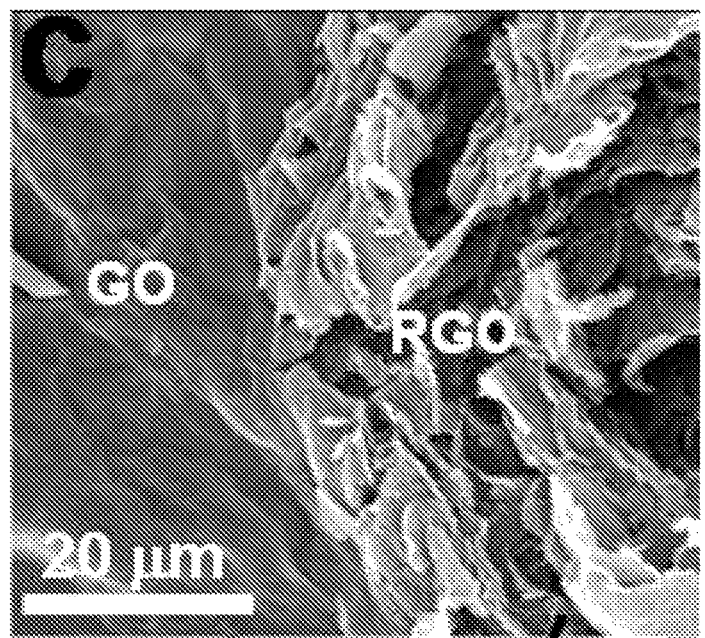
Figure 4D:
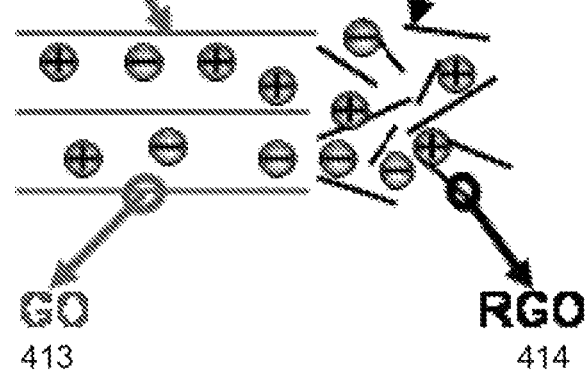

The ionic conductivity of hydrated GO was calculated from the impedance spectra obtained for the devices [Abraham 1997] and the value is 1.1 E-5 S/cm for the sandwich geometry and 2.8 E-3 S/cm for the in-plane one. This anisotropy can be explained by the microscopic GO-sheet arrangement shown in FIGS. 4A-4D. FIG. 4A shows a scan rate dependence in cyclic voltammetry measurement for in-plane structure at 5 mV/s, 10 mV/s, 20 mV/s, 40 mV/s, 60 mV/s, and 80 mV/s (curves 401-406, respectively). FIG. 4B shows a scan rate dependence in cyclic voltammetry measurement for sandwich structure at 5 mV/s, 10 mV/s, 20 mV/s, 40 mV/s, 60 mV/s, and 80 mV/s (curves 407-412, respectively). FIG. 4C is an SEM image showing the interface between GO 413 and RGO 414 in the films (scale bar shown is 20 μm). FIG. 4D is a schematic of the proposed microstructure and chemical structure of the interface. The circles represent freely diffusing charge carriers between the graphitic planes.

Figure 5:
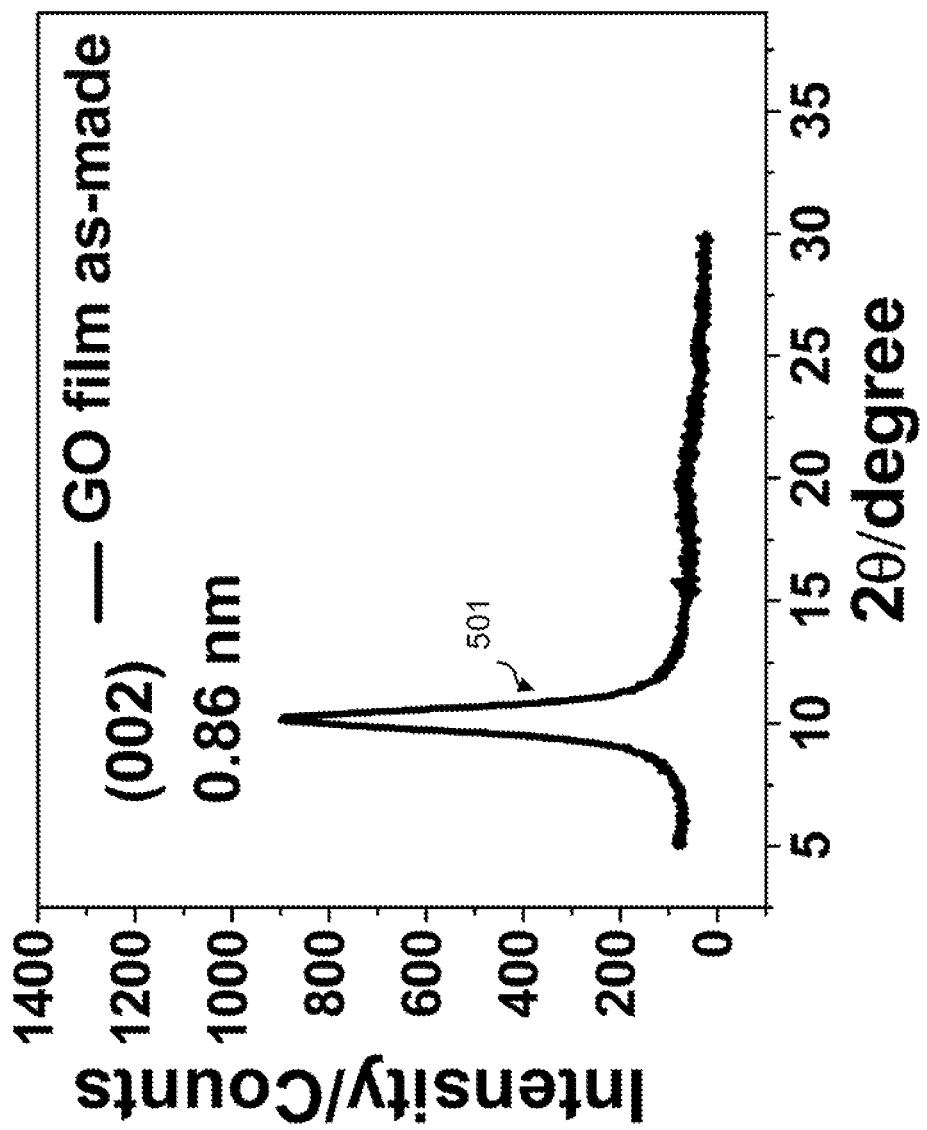
FIG. 5 shows an XRD pattern of as-prepared Hydrated GO film.

As shown in FIG. 5, The hydrated GO film had an anisotropic structure with z-lattice distance of 0.86 nm shown by XRD characterization. FIG. 5 shows an XRD pattern of as-prepared Hydrated GO film (curve 501). The interlayer spacing is defined by the (002) peak, corresponding to a spacing of 8.6 Å. Thus, ions can move more easily along the interlayer direction rather than in direction normal to the layers. This is similar to the anisotropic electrical conductivity reported for graphite and GO platelets. [Hirata 2005].

Figures 6A, 6B:
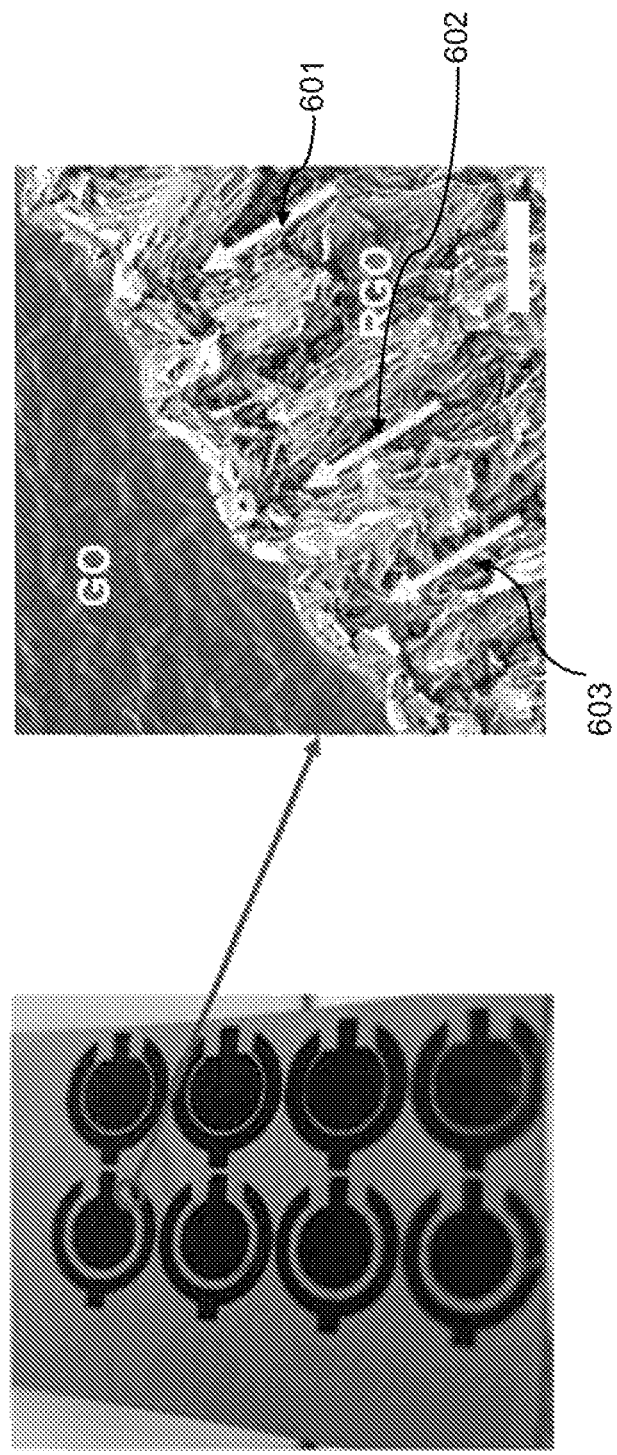
FIG. 6A shows a photograph of an array of concentric circular patterns fabricated on a free-standing hydrated GO film.
FIG. 6B shows an SEM image of the interface between GO and RGO.

In EDLC, electrical energy storage is achieved by nanoscopic charge (ion) separation at the interface between electrode and electrolyte. In our system, the only source of ions is hydrated GO. The morphology and structure of a GO film is shown in FIGS. 6A-6B and FIGS. 4A-4D. FIG. 6A shows a photograph of an array of concentric circular patterns fabricated on a free-standing hydrated GO film. FIG. 6B shows an SEM image of the interface between GO and RGO (scale bar 100 μm), with arrows 601-603 indicating long range pseudo-ordered structure generated by the laser-beam scanning.

The higher value of the interlayer spacing (0.86 nm) (see FIG. 5) in hydrated GO as compared to completely dehydrated GO (reported to be 0.567 nm [Cerveny 2010]) is an indication of the high water content within the films of the present invention. The water content in hydrated GO has also been determined to be ~16 wt % with Karl-Fischer Titration. [Goo 2009]. The interaction between the trapped water and GO layers is central to the ionic conductivity observed. At low concentration, $H_2O$ molecules bind to GO sheets via strong intermolecular interaction (hydrogen bonding): as the water content increases, the active sites on GO sheets get saturated, and the excess water molecules becomes free to rotate and diffuse. The reported transition point of water content between the bonded-water state and free-water state is ~15 wt %. [Cerveny 2010]. It is believed that the protons, which are the species here taking part in ionic conduction, come from the hydrolysis of the functional groups (carboxyl, sulfonic [Petit 2009] and/or hydroxyl) present on GO, and the resulting protons can move via Grotthuss Mechanism [Agmon 1995], which is hopping via hydrogen bonding network, or even freely migrate in the hydronium form ($H_3O^+$) within the interlayer spaces (FIG. 4A-4D). The proton transport here seems to be similar to that seen in Nafion, a well-investigated polymer system which shows water induced proton transport following a hopping mechanism. ["Saito 2004"].

Impedance spectroscopy measurements were conducted on the films with control over environment (vacuum) to study the dehydration-rehydration influence on pristine hydrated GO films.

Figure 7:
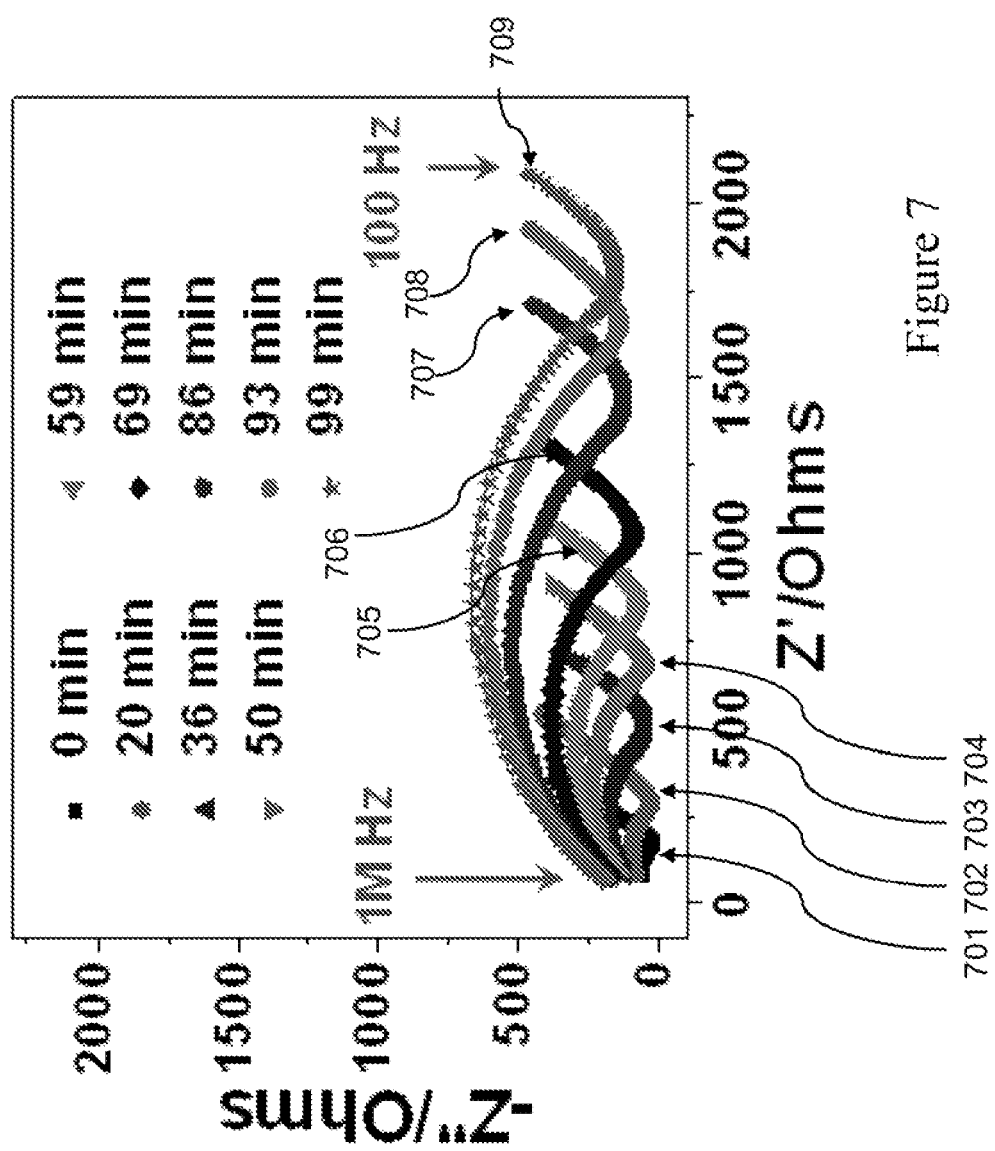
FIGS. 7-9 show a characterization of water effect in GO ionic conductivity.

As seen in FIG. 7, a stepwise decrease in the ionic conductivity was observed with increase in exposure time to vacuum, and a full recovery is seen after re-exposure to air for three hours. FIG. 7 shows this stepwise change in impedance spectra versus exposure time to vacuum (0.08 MPa) at 25° C. (at 0 min., 20 min., 36 min., 50 min., 59 min., 69 min., 86 min., 93 min., and 99 min. in curves 701-709, respectively). The cell structure was a pristine GO film coated with Ag on both sides, and sandwiched between two pieces of stainless steel foil (1 cm by 1.2 cm square), and the frequency range was 1 MHz to 100 Hz at 10 mV sinusoidal signal. Water was slowly evaporated out of the film under vacuum, leading to the increase in the arc diameter in the high frequency range that indicated the decrease in the ionic conductivity.

Figure 8:
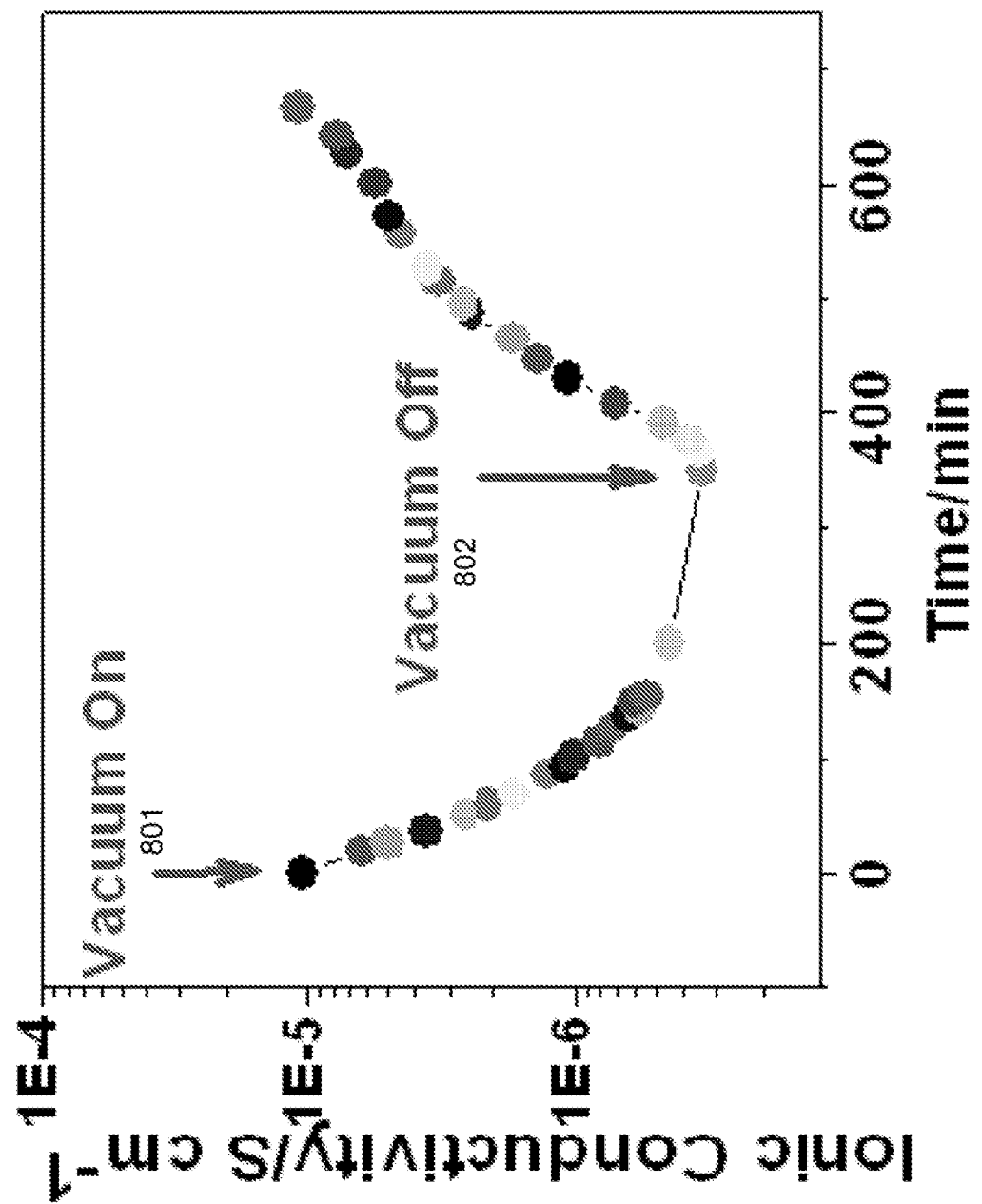
Figure 9:
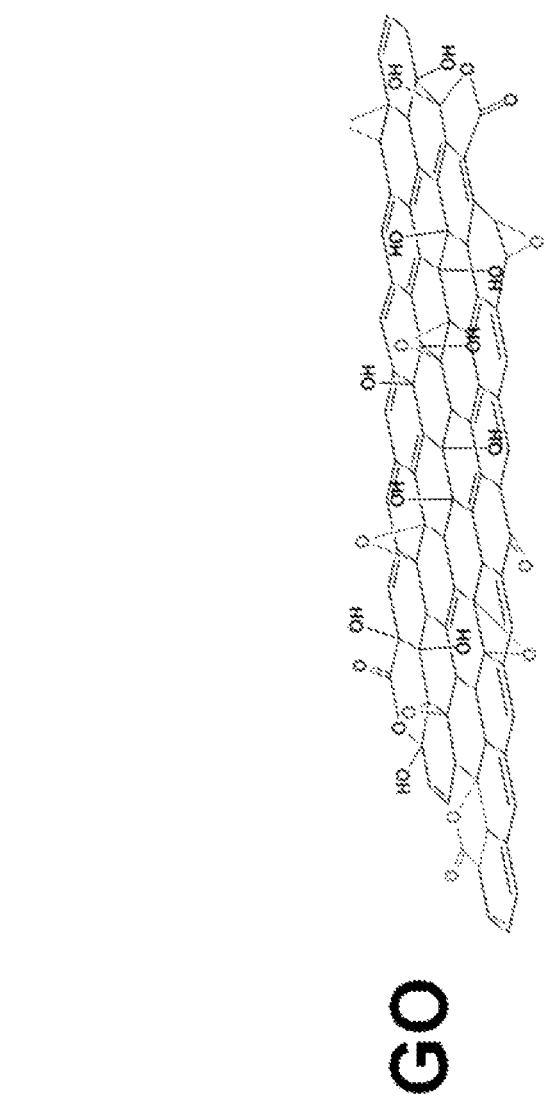
Figure 10A:
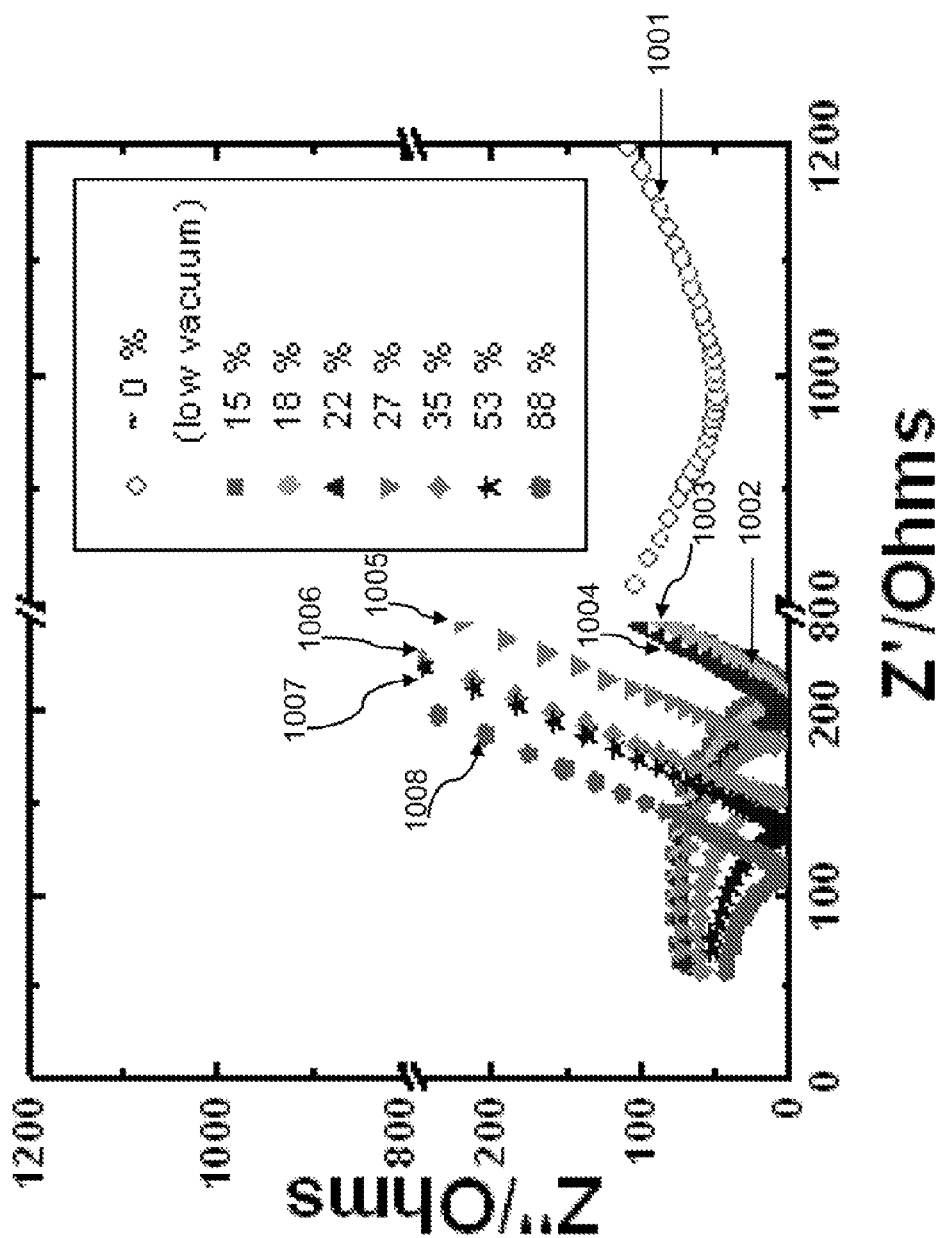
FIG. 10A shows the evolution of the impedance spectra of GO film at various humidity conditions, 1 MHz to 10 mHz at 10 mV sinusoidal signal, zoomed in at the high frequency region.
Figure 10B:
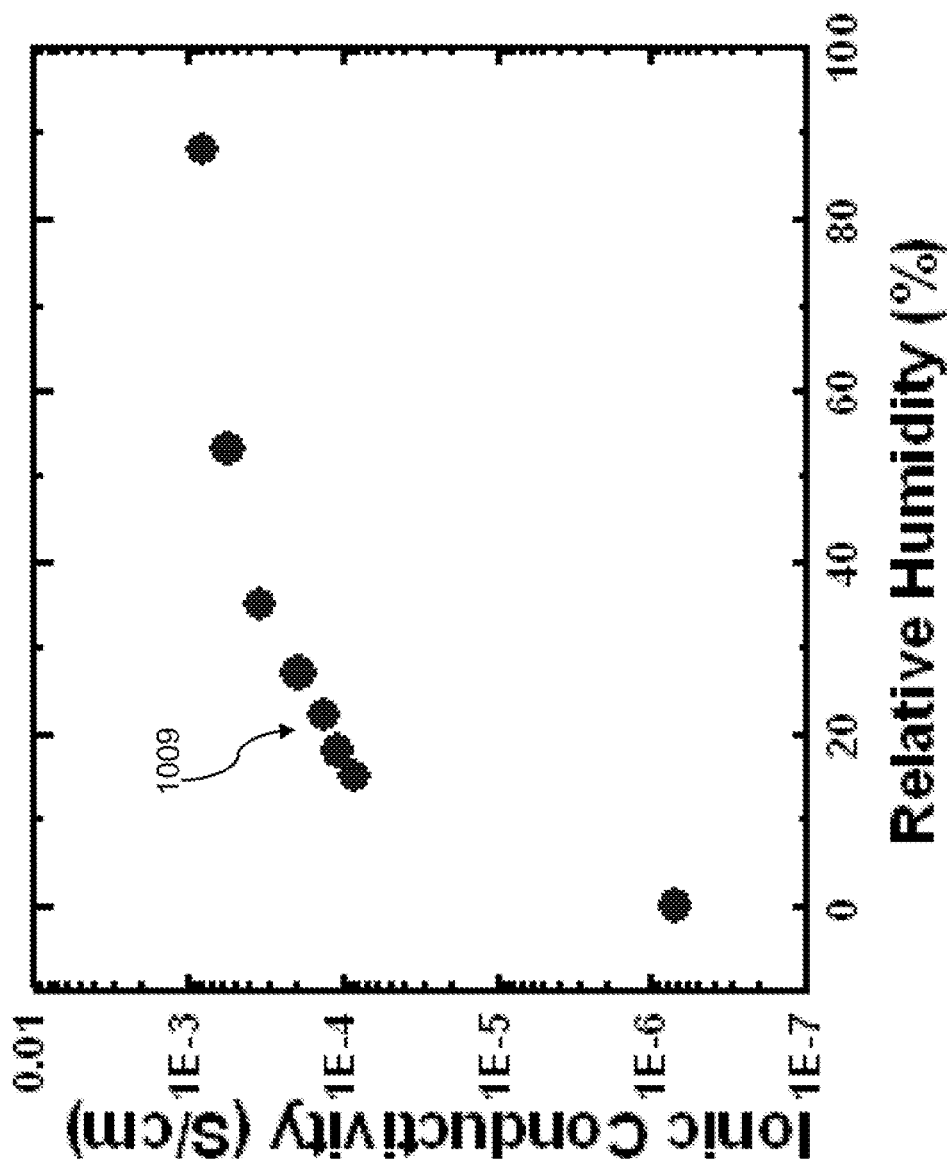
FIG. 10B shows the calculated ionic conductivity dependence upon relative humidity, obtained from the arc diameters in the impedance spectra at high frequencies.
Figure 10C:
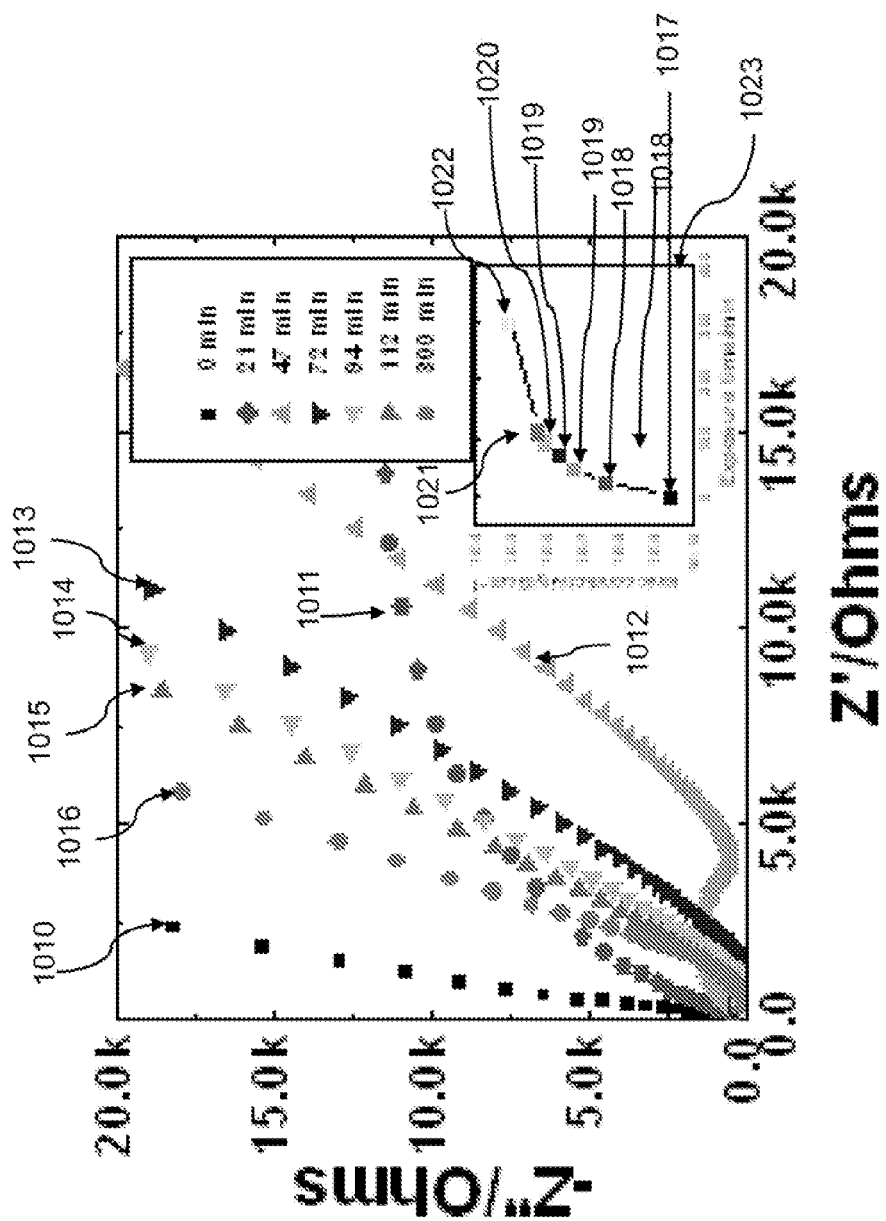
FIG. 10C shows the evolution of the impedance spectra of a pre-dried sandwich device upon exposure time in air, 1 MHz to 10 mHz at 10 mV sinusoidal signal, zoomed in at the high frequency region.
Figure 10D:
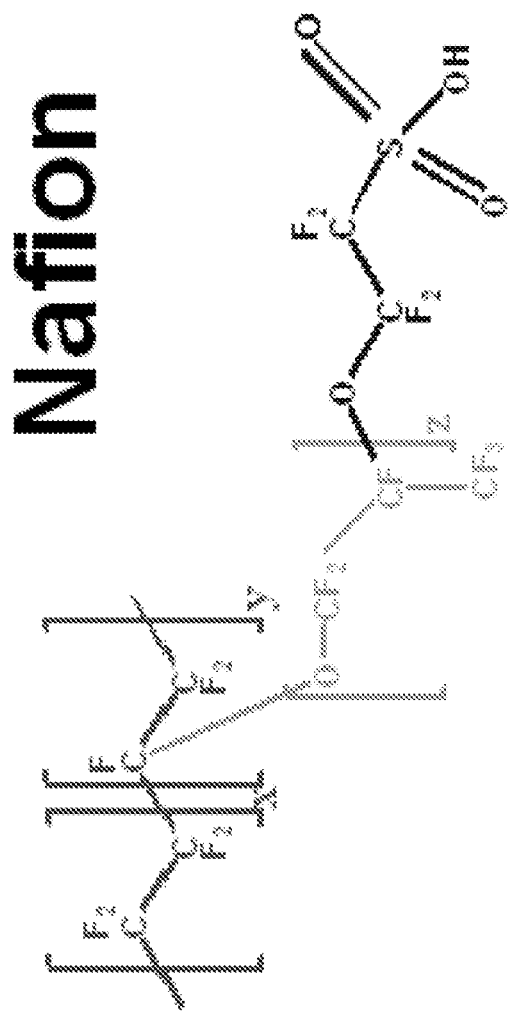
FIG. 10D shows the chemical structure of Nafion.

The ionic conductivity calculated from the impedance spectra versus exposure time is shown in FIG. 8. FIG. 8 shows a dependence of ionic conductivity on exposure time to vacuum and air (vacuum on at 801 and vacuum off at 802). Conductivity data were obtained from Zview fitting of the impedance spectra. Hydrated GO film became less conductive under vacuum, but recovered its full conductivity after three hours of re-exposure to air. After six hours under vacuum, there was two orders of magnitude decrease in the ionic conductivity of the device, which was also fully recovered after exposure to air, indicating the reversibility of this process at room temperature (see FIGS. 10A-10D for high temperature reversal of ionic conductivity). The dramatic changes in ionic conductivity resemble the proton-conducting behavior of Nafion. [Sailo 2004] The chemical structure and properties of GO and Nafion are shown in FIG. 9 and FIG. 10D, respectively. The active group in Nafion is sulfonic acid group [Mauritz 2004], while in GO, it could be carboxylic acid group, sulfonic acid group [Perii 2009], or even tertiary alcohol group: furthermore, large amount of existing epoxy groups in GO could also help proton migration. The application of Nafion as an electrolyte and a separator in supercapacitor devices has been reported. [Park 2002]. Our observations in relevance to the Nafion-like conduction strongly suggest that hydrated GO is acting like an ionic conductor, with its ionic/proton conductivity influenced by the water content.

The ionic conductivity of GO film is significantly influenced by the environment humidity. As seen in FIGS. 10A-10B, The humidity dependence of its ionic conductivity from a sandwich geometry GO film with impedance spectra characterization was observed. FIG. 10A shows the evolution of the impedance spectra of GO film at various humidity conditions (0%, 15%, 18%, 22%, 27% 35%, 53%, 88% of curves 1001-1008, respectively). 1 MHz to 10 mHz at 10 mV sinusoidal signal, zoomed in at the high frequency region. FIG. 10B shows the calculated ionic conductivity dependence upon relative humidity (curve 1009), obtained from the arc diameters in the impedance spectra at high frequencies. Almost three orders of magnitude increase in conductivity was observed upon hydration. (See FIG. 108).

The dehydration-rehydration process on the sandwich-like supercapacitor structure was evaluated, which further showed the water assisted ion-conduction mechanism. The device was put in a vacuum oven and heated up to 105° C. for two days. After it was taken out and exposed to air, impedance spectroscopy measurements were immediately conducted. A stepwise increase in the ionic conductivity of the electrolyte (FIG. 10C) was observed with increase in exposure time in air. FIG. 10C shows the evolution of the impedance spectra of a pre-dried sandwich device upon exposure time in air. 1 MHz to 10 mHz at 10 mV sinusoidal signal, zoomed in at the high frequency region (0 min., 21 min., 47 min., 72 min. 94 min., 112 min., and 300 min. of curves 1010-1016, respectively). Insert 1023 shows the calculated ionic conductivity dependence upon exposure time in air, obtained from the arc diameters in the impedance spectra at high frequencies (0 min., 21 min., 47 min., 72 min., 94 min., 112 min., and 300 min. of 1017-1022, respectively). The ionic conductivity calculated from the impedance spectra versus exposure time is presented in insert 1023. After around two hours, there is at least 3 orders of magnitude increase in the ionic conductivity. This dramatic change resembled the proton-conducting behavior of the well-known cationic conducting polymer-Nation. [Saito 2004].

Figure 11A:
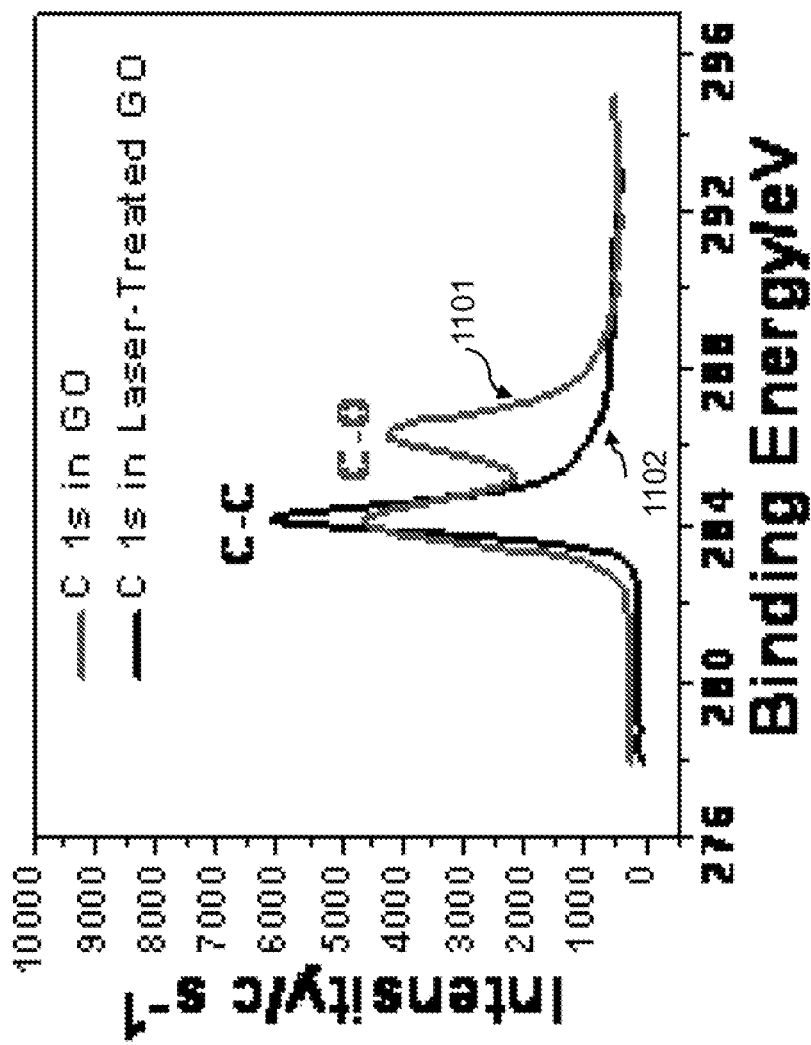
FIG. 11A shows an XPS (X-ray Photoelectron Spectroscopy) high resolution C1s signal of original GO film and laser treated GO film (RGO).
Figure 11B:
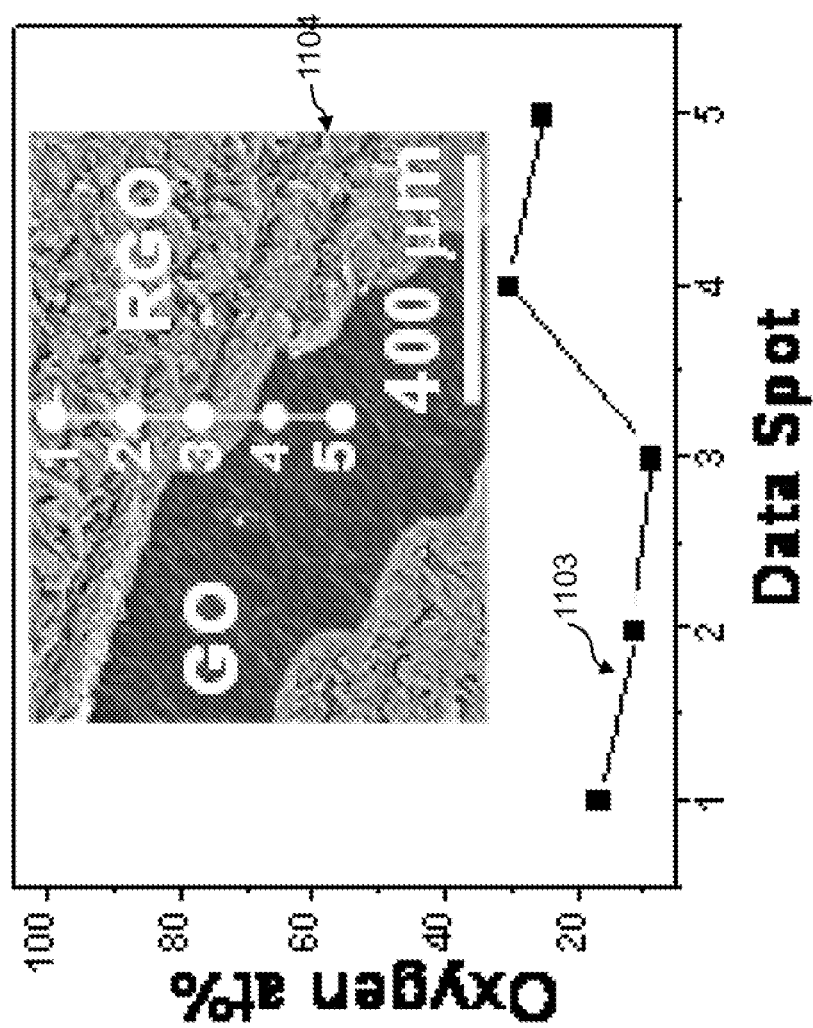
FIG. 11B shows local oxygen atomic percentage (O at %) by XPS scan through the interface between RGO and GO. The insert shows an SEM image of the RGO/GO interface, and the corresponding data spot locations, X-ray beam size: 9 μm.
Figure 11C:
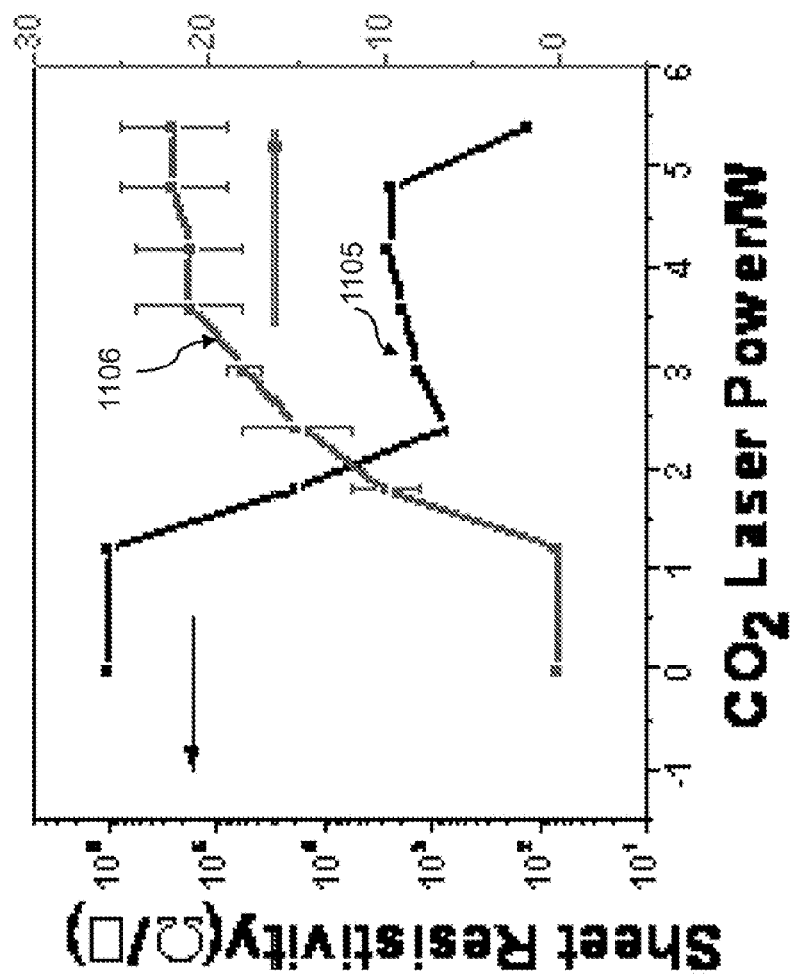
FIG. 11C shows dependence of sheet resistivity and RGO thickness on laser power in the laser treatment process.
Figure 11D:
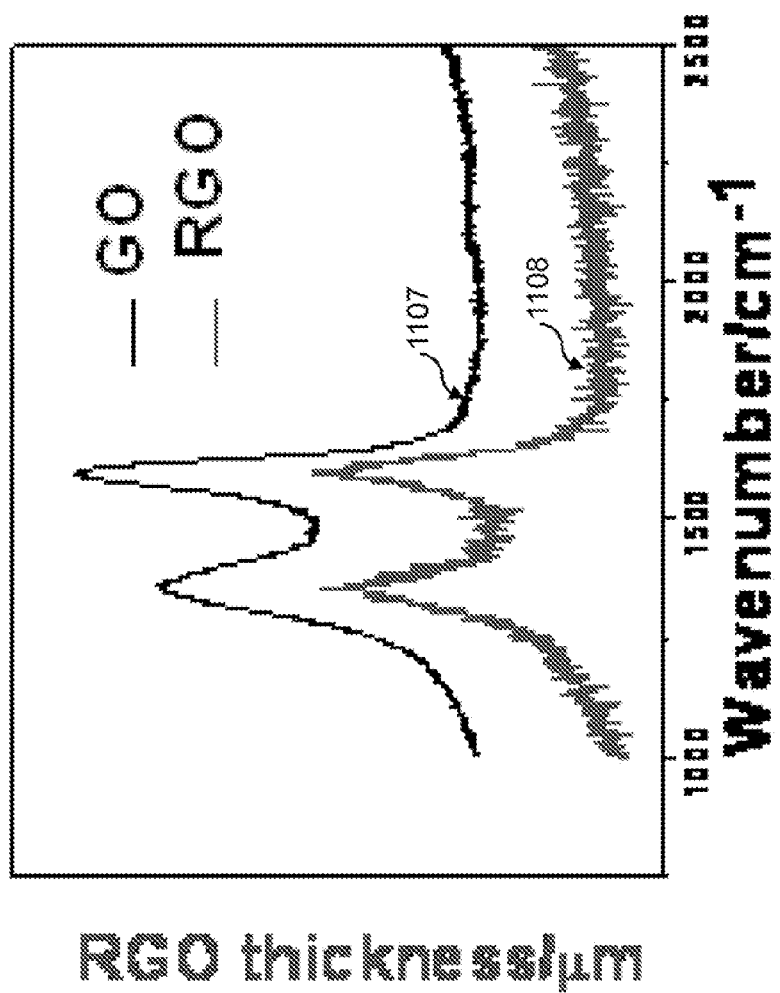
FIG. 11D shows a Raman spectra characterization of GO and laser treated GO (RGO).

The fact that GO can easily be converted to RGO via laser radiation, enables scalable production of any number of in-plane or sandwiched RGO-GO-RGO supercapacitor devices via laser patterning of hydrated GO in a simple way. The active electrode material, RGO, formed from hydrated GO using laser heating is porous due to the evolved gases from the decomposition of functional groups [Gao 2009] and water during localized laser heating. The dependence of RGO resistivity and reduction depth upon laser power is shown in FIGS. 11A-11D and up to four orders of magnitude decrease in resistivity can be achieved by this laser treatment, in consistent with previously reported work. [Wei 2010]. FIG. 11A shows an XPS (X-ray Photoelectron Spectroscopy) high resolution C1s signal of original GO film (curve 1101) and laser treated GO film (RGO) (curve 1102). FIG. 11B shows local oxygen atomic percentage (0 at %) by XPS scan through the interface between RGO and GO (curve 1103). Insert 1104 shows an SEM image of the RGO/GO interface, and the corresponding data spot locations, X-ray beam size: 9 μm. The RGO/GO interface lies between spot No. 3 and 4, obvious oxygen content change was observed across the interface, whereas the O at % variation within each part were probably due to thermal diffusion or adsorption of small organic molecules on the surfaces. FIG. 11C shows dependence of sheet resistivity (curve 1105) and RGO (curve 1106) thickness on laser power in the laser treatment process. Thickness data were obtained by SEM analysis. FIG. 11D shows a Raman spectra characterization of GO (curve 1107) and laser treated GO (RGO) (curve 1308). Acquisition parameters: 514.5 nm laser with 1.65 mW power, 10 s exposure time, 5 accumulation, and 1800 l/m gridding, where signals are adjusted in intensity to facilitate comparison.

Figure 12:
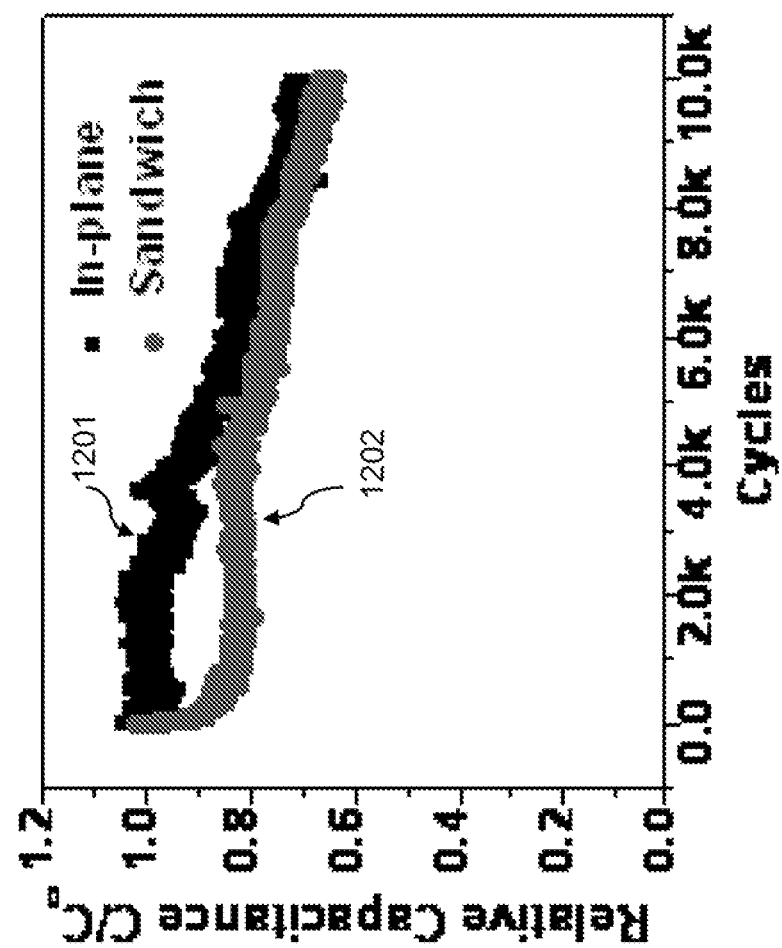
FIG. 12 shows a long cyclability tests of the as-prepared sandwich and concentric circular devices (curves 701-702, respectively), with less than 35% drop in capacitance after 10,000 cycles.
Figure 13:
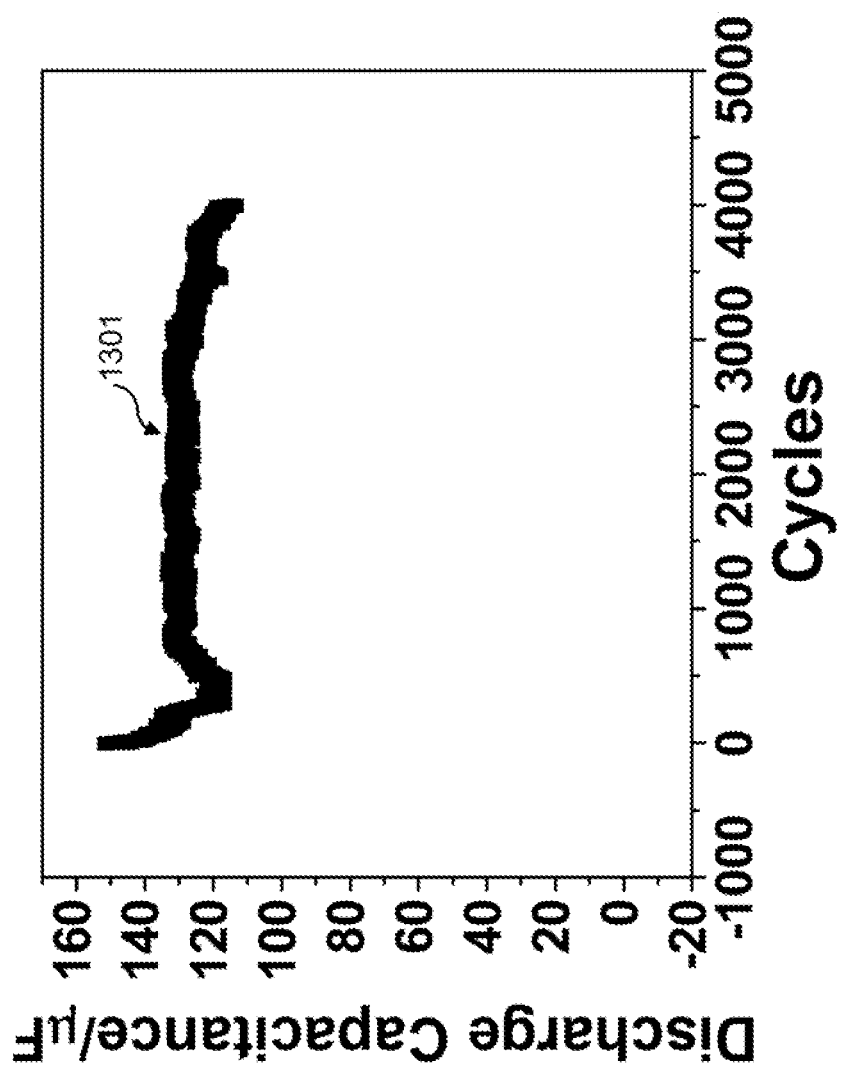
FIG. 13 shows cyclability test of the device with concentric circular geometry for a week in ambient after its first 10,000 cycling test.

The long-range ordered structure [Punckt 2010] in RGO (FIG. 6B) facilitates the ion-diffusion within the electrode. However, the short-range random arrangement of RGO flakes could lead to resistance for ion migration [Taberna 2006], as indicated in the impedance spectra (FIG. 3B) The cyclic stability tests performed on the supercapacitor devices are shown in FIG. 12. After 10,000 cycles, there is ~30% drop in the capacitance of the in-plane circular device (curve 1201), whereas a ~35% drop is noticed for the sandwich devices (curve 1202). The drop seen in capacitance upon cycling is typical of many supercapacitor devices reported in literature. [Balducci 2005; Wang 2010]. It is believed that the decline in capacitance could be due to water loss in the device. The capacitance doubled after the very device after long cycling was kept in ambient for a week. FIG. 13 shows cyclability test of the device (curve 1301) with concentric circular geometry for a week in ambient after its first 10,000 cycling test. The capacitance almost doubled and remained stable for ~4,000 cycles of testing.

Figure 14A:
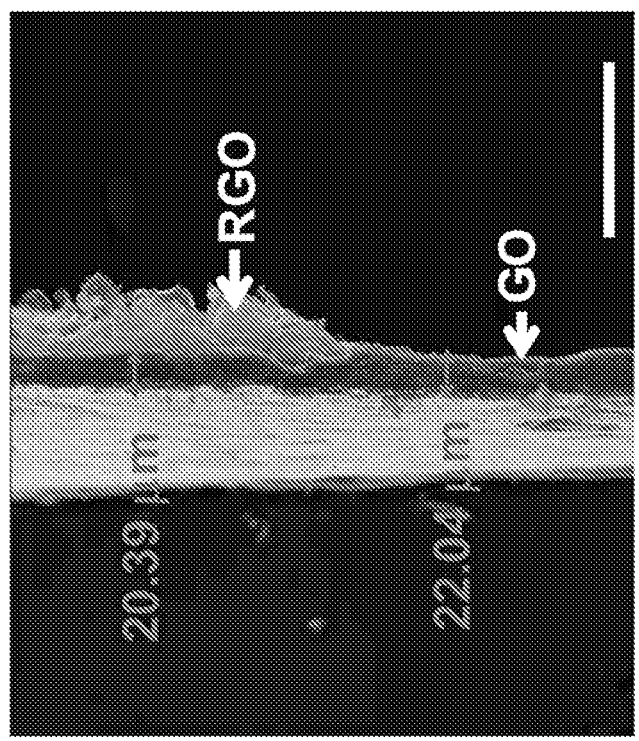
FIGS. 14A-14B show SEM characterization of the laser-patterned Hydrated GO film (parallel column sample).
Figure 14B:
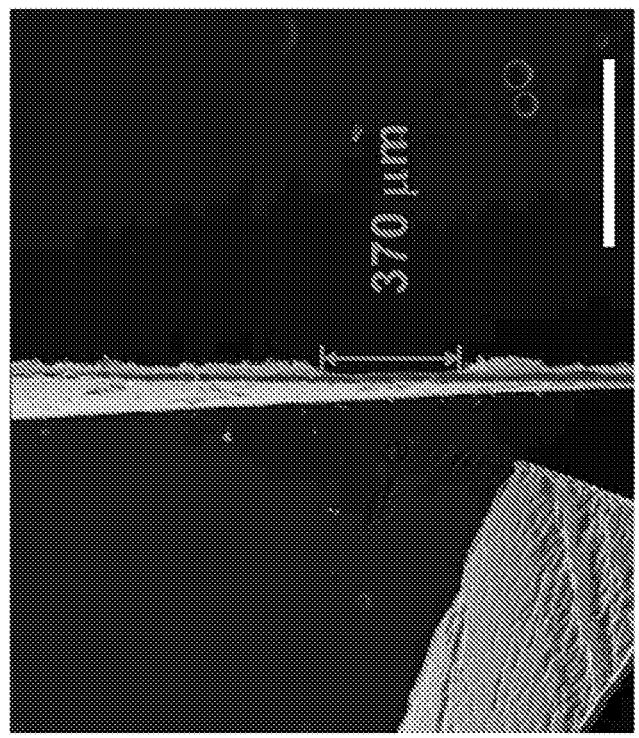
Figure 15A:
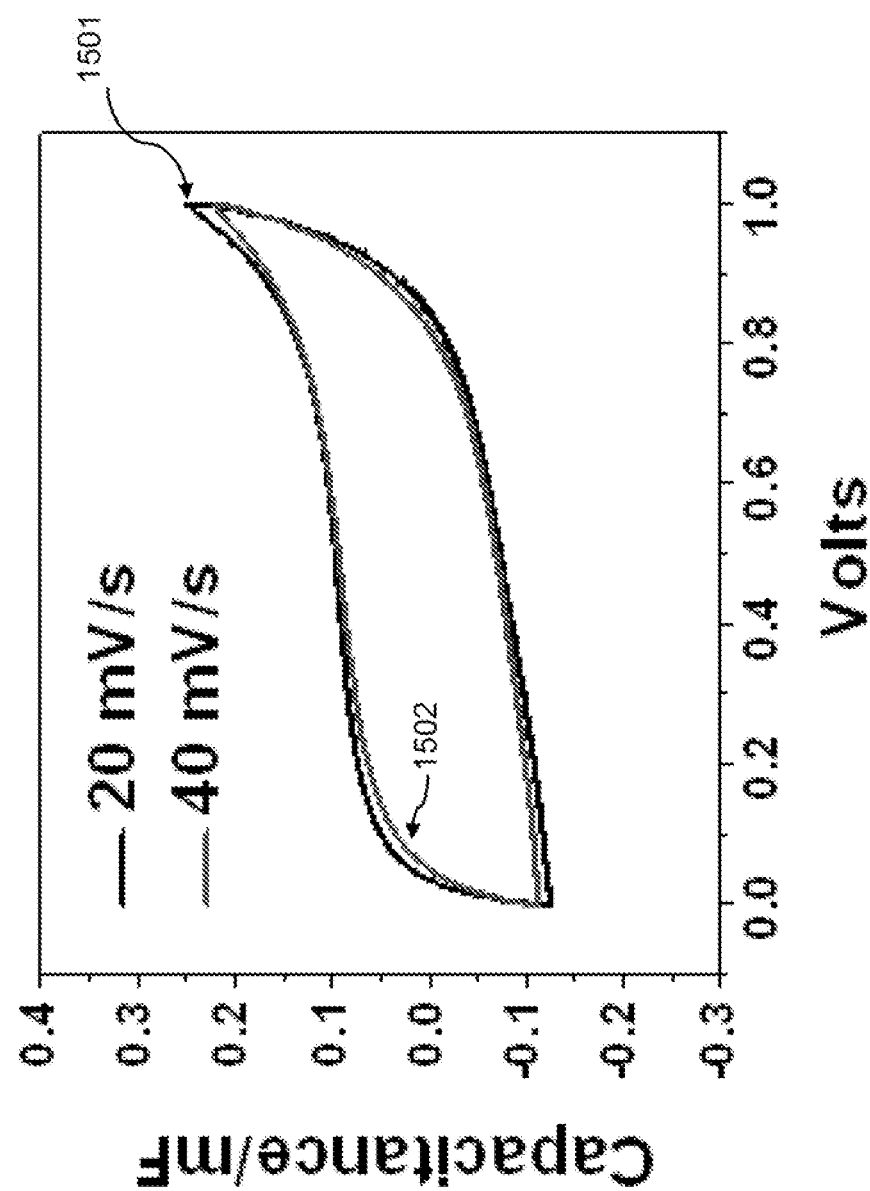
FIG. 15A shows CV curves of a concentric circular in-plane device at 20 and 40 mV/s scan rate (curves 1501 and 1502, respectively).
Figure 15B:
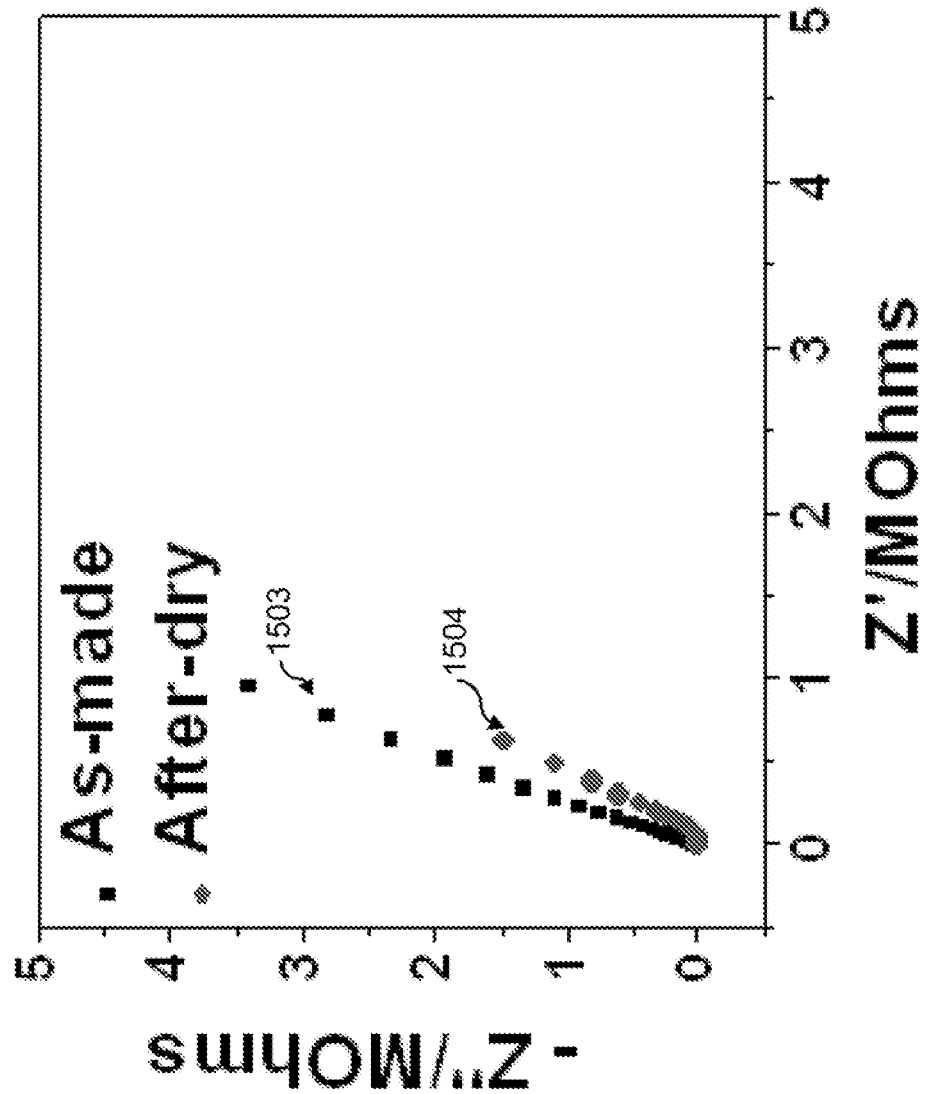
FIG. 15B shows the impedance spectra of the device before and after drying in vacuum oven (curves 1503 and 1504, respectively): 1 MHz to 10 mHz at 10 mV sinusoidal signal.
Figure 15C:
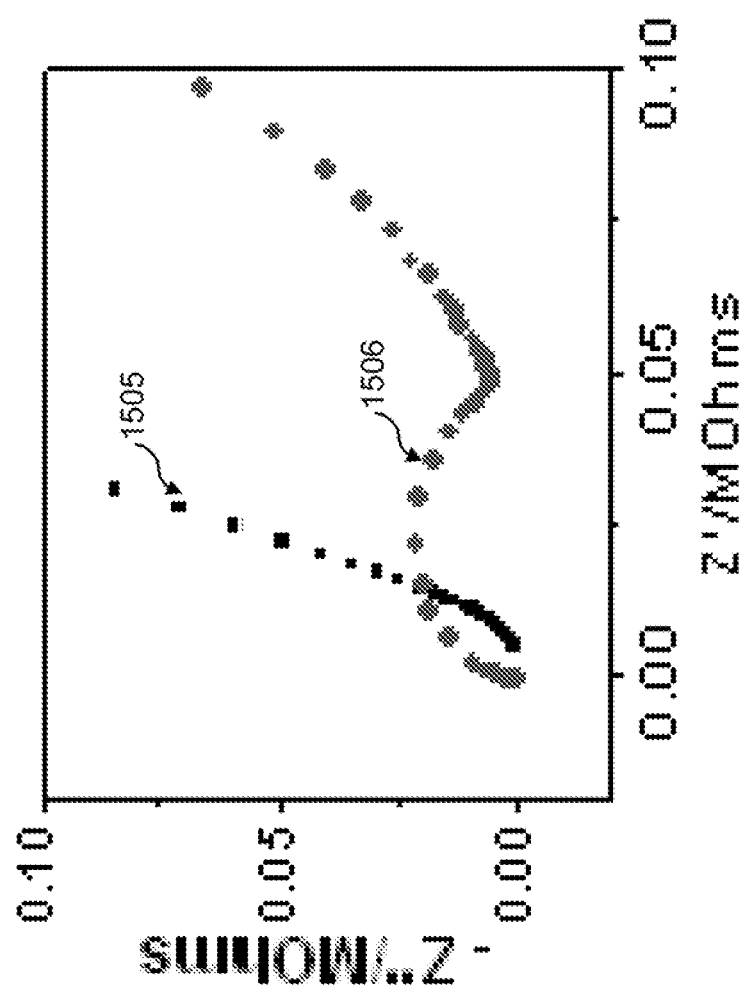
FIG. 15C shows a zoom-in diagram at high frequencies (before and after drying in vacuum oven shown in curves 1505 and 1506, respectively), obvious increase in the arc diameter is observed after drying, corresponding to lower ionic conductivity.

The in-plane circular design showed the highest specific capacitance of ~0.51 $mF/cm^2$. Considering only the active thickness of the electrodes, the volumetric capacitance corresponded to ~3.1 $F/cm^3$, where the electrode volume is estimated from the thickness of the reduced region (FIGS. 14A-14B). The energy density for this device was calculated to be approximately 4.3 E-4 $Wh/cm^3$, with a power density of 1.7 $W/cm^3$. Due to the lower ESR value, the sandwich device geometry gave a higher power density of ~9.4 $W/cm^3$, although the energy density for this device was lower (1.9E-4 $Wh/cm^3$). A good match between the 20 mV/s and 40 mV/s CV scan rates (FIGS. 15A-15B) indicates similar ion diffusion paths within this scan rate range. [Stoller 2008] However, the decrease of capacitance was observed when the scan rate was increased to 100 mV/s. It is believed that this could be due to the inhomogeneous pore structure within the electrodes or the pseudo-capacitance caused by the impurities and hetero-atoms remaining in RGO.

Figure 16:
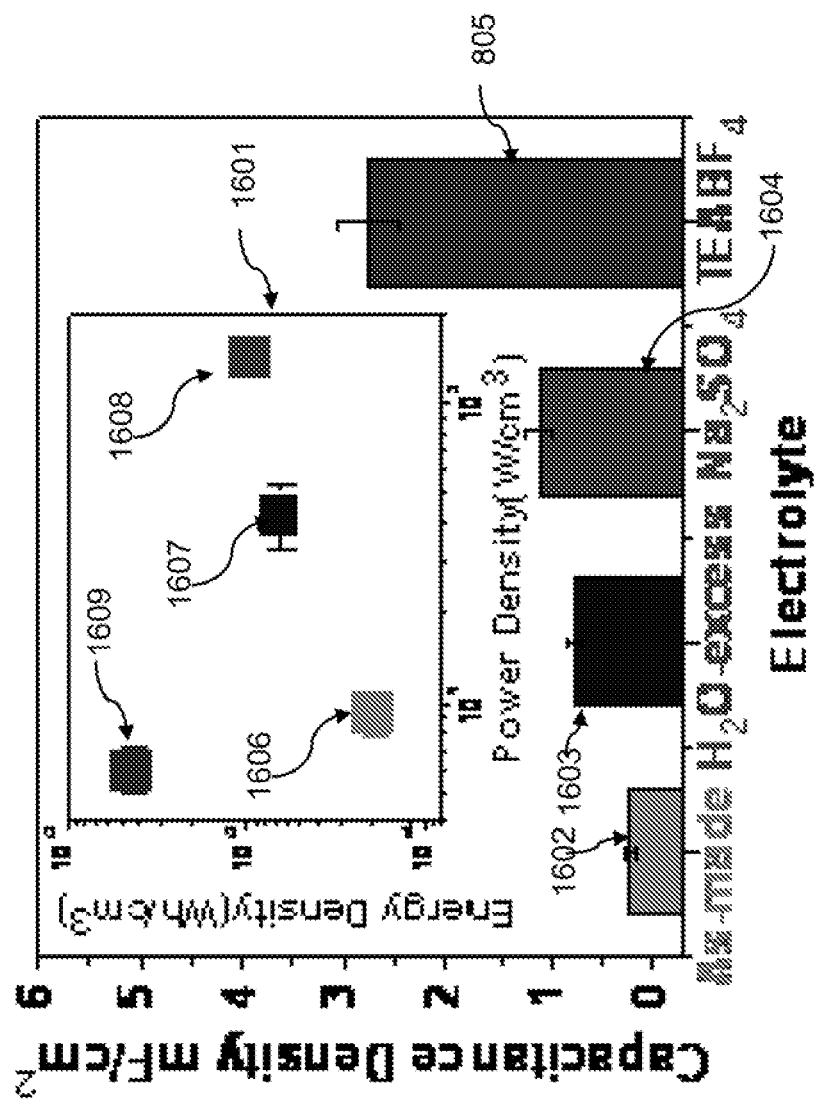
FIG. 16 is a histogram comparison of area-based capacitance density of a sandwich device as-prepared (1602), with excess DI water (1603), aqueous electrolyte (1604) (1.0 M Na2SO4), and organic electrolyte (1605) (1.0 M TEABF4). Inset 1601 shows volumetric energy density versus power density data of the corresponding devices shown in the same (1605-1608, respectively). Error bars represent the standard error of the mean of five independent experiments.

When an extra drop of deionized (DI) water was added into the as-prepared device, the ion transport was enhanced, showing a three-fold increase in capacitance. (FIG. 16). In the presence of external electrolytes, the performance of the devices is further improved. The capacitive behavior with external aqueous (1.0 M $Na_2SO_4$) and organic (1.0 M $TEABF_4$ in acetonitrile) electrolyte was characterized and results for the sandwich device is shown in FIG. 16. See also FIG. 17.

Figure 17:
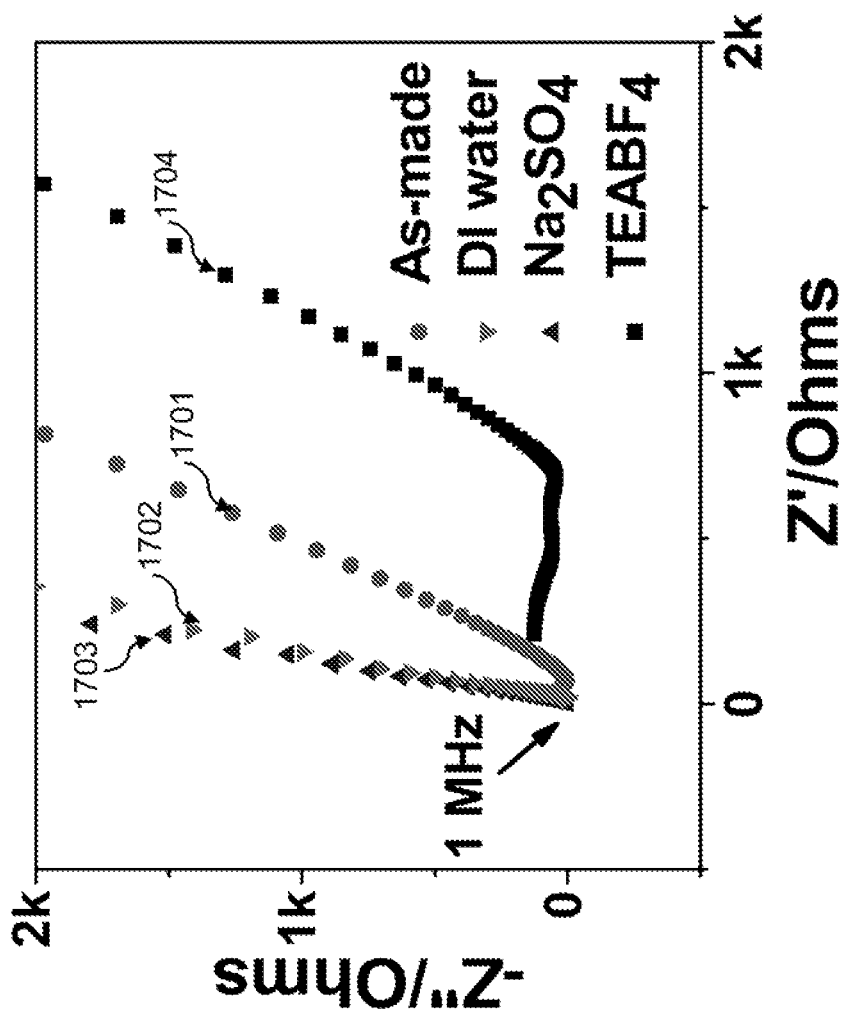
FIG. 17 shows impedance spectra of a sandwich device as prepared (1701), with water (1702), and external electrolytes added ($Na_2SO_4$ (1703) and $TEABF_4$ (1704)). 1 MHz to 10 mHz at 10 mV sinusoidal signal, zoomed in at the high frequency region.

For devices with added external electrolytes, nearly five-fold increase in capacitance and 95% decrease in ESR were observed right after addition of a few drops of Na2SO4 solution, due to the presence of additional inorganic ions within the device. As for organic electrolyte the as-prepared device was put in a vacuum oven and heated up to 105° C. for 2 days to remove all the absorbed water, and after drying, the device was immediately transferred to a dry glove box where the organic electrolyte was added. In the end the device was laminated between two sheets of moisture-resistant plastic. The CV response showed twelve-fold enhancement in capacitance and five-fold increase in ESR immediately after organic electrolyte addition (FIG. 17). Larger capacitance obtained with organic over aqueous electrolyte is simply due to the larger amount of organic electrolyte added into the device, since solubility of GO limited the total amount of water present in the device. Furthermore, the capacitance in organic electrolyte was strongly influenced by the scan rate in CV, indicating less uniform ion-migration path within structures than those of as-prepared and aqueous-electrolyte cases. The capacitance and ESR value with external electrolyte degrades faster with increasing number of cycles, probably due to the chemical activity of GO.

Embodiments of the present invention show ionic conductivity and the use of as-prepared hydrated GO films as a new type of separator/electrolyte membrane system. The ability to reduce and pattern hydrated GO films by laser irradiation will enables a scalable process to write micro-supercapacitors on these films, which work with or without the use of external electrolytes. GO films offer an entirely different type of porous solid electrolyte and find applications as light weight membranes in several energy storage applications.

Laser Printing of Energy Storage Device.

The as-prepared composite film was directly put into the printing chamber and patterned with predesigned geometry by the $CO_2$ laser beam. The laser power was carefully monitored and optimized to give highest conductance while maintaining film integrity.

Energy Storage-Capacitor Industry:

GO reduction products (RGOs) have recently been reported to offer rather high specific capacitance (around 200 F/g) [Stoller 2008; Wang 2009] and are also relatively low in cost due to the large scale availability of the starting material "graphite." The laser-heating technique provides high flexibility in geometry design and feasibility in manufacturing process. Our procedure offers a new solution to capacitor industry with various choices in device geometries.

Electronics:

This new material with controllable electrical-conducting and insulating patterns in micro scale could also find applications in electronic devices, such as p-n junctions and solar cells.

Water Purifications:

Membrane fabrication is very important and rapidly developing in water purification industry. Our GO-membrane composition can be adjusted by incorporating certain amount of functional polymers, leading to some composite membranes that are both water permeable and electrically tunable in conductivity with any pattern wanted. This membrane could offer useful applications in electro-deionization (EDI) process.

The traditional supercapacitor devices generally will employ a sandwich-like structure. A protocol can be utilized to make two-dimensional (2D) in-plane capacitive patterns with a one-step laser-printing technique. The resulting capacitors take the heated parts as electrodes and the original parts as electrolyte as well as separators.

Embodiments of the present invention utilize intact GO portion on the membrane as electrolyte and separator, thus making the 2D monolithic capacitor structure possible. This change from prior processes facilitates the electrolyte diffusion within the interlayer of original and heated GO sheets, and offers high flexibility in design and facility in manufacturing processes. By this process, an array of capacitive patterns can be printed on free-standing GO films.

The present invention is not limited to laser heating, but can utilize other techniques, like controllable UV-irradiation or hot AFM tip scanning to achieve conducting patterns on the membrane. The design of the pattern can be adjusted for different application to obtain the better efficiency. For instance, embodiments of the invention include three different patterns (concentric circles, hairbrushes and parallel columns) for supercapacitor applications, which different patterns reflecting differences in performance observed. Useful patterns can also be employed to address the applications in microelectronics and salt-water deionization.

The following methods were utilized during to perform some of the above.

Preparation of Hydrated GO film

Graphite oxide was prepared according to the modified Hummers method. [Hummers 1958; Gilje 2007] The as-prepared Hydrated GO is stored in a vacuum chamber together with $P_2O_5$.

To make free-standing films, GO were dispersed in DI water in a concentration of 6 mg/ml. The colloidal solution was sonicated in water bath for 1 hour to achieve homogeneous dispersion. For a typical film preparation, 50 ml of the dispersion was poured into a vacuum filtration setup, filtered under low vacuum for 3 days with a nitrocellulose membrane (0.025 µm, Millipore). The resulting film is around 22 µm in thickness (FIGS. 14A-14B), approximately 240 mg by weight, 8.7 cm in diameter, free-standing and flexible.

Supercapacitor Fabrication and Characterizations

The patterned Hydrated GO film was covered with the corresponding current collectors (polyvinyl tape pattern or carbon coated Al foil) and placed between two pieces of glass slides for easier handling. Copper tape was pasted to the current collector for external electrical contact. Electrolytes were injected into the devices by syringes.

CV curves were obtained at the scan rates of 20 mV/s and 40 mV/s. GAL curves were measured at a constant current of 5 µA or 10 µA. EIS was done using a sinusoidal signal with the mean voltage of 0 V and amplitude of 10 mV over a frequency range of 1 MHz to 10 mHz. The capacitance value was calculated from the CV and GAL data according to the following formula:

$$C(device) = I/(dV/dt)$$

where I refers to the mean current in CV curves and set current in GAL, respectively; dV/dt refers to the scan rate in CV curves and slope of the discharge curves in GAL.

Capacitance density was calculated by the formula:

$$C_A = \frac{C(\text{device})}{A} \text{ or } C_V = \frac{C(\text{device})}{V},$$

where A and V refer to the total surface area and volume of the positive and negative electrodes in $cm^2$ and $cm^3$, respectively.

In the concentric circular device, A is 0.1413 $cm^2$, and V is calculated to be 2.33 E-5 $cm^3$ according to the following formula:

$$V = \pi r_1^2 * d_r$$

where $r_1$ refers to the radius of the inner RGO circle that is used as one electrode, and $d_r$ refers to the depth of reduction applied to the original film (FIGS. 14A-14B); for sandwich structure, the electrode area A becomes 1.28 $cm^2$, corresponding to the total area of both 8 mm×8 mm squares, and V is calculated to be 2.11 E-4 $cm^3$ accordingly.

Maximum Power density was obtained from $$P = \frac{U^2}{4 \times ESR \times V},$$

where P is the power density in $W/cm^3$. U is the potential window used in Volt and ESR is the equivalent series resistance value in f, measured with impedance spectroscopy.

Energy density was calculated according to $$E = \frac{C_V \times U^2}{2} \times \frac{1}{3600},$$

where E is the energy density in $Wh/cm^3$, Cv is the volume-based specific capacitance in $F/cm^3$, and U is the potential window used in Volt.

Ionic Conductivity Measurement of Pristine GO Films

Silver was chosen as the contact metal according to its reported preference over gold and platinum at temperatures below 600° C. [Macdonald 2005]. For the ionic conductivity measurement, the impedance spectra obtained turned out to be a depressed semicircle with a slanted line at lower frequencies. In solid electrolyte system, the corresponding equivalent circuit for this type of spectra is typically represented by electrode resistance in series with a parallel combination of electrolyte resistance and capacitance [Abraham 1997]. Therefore, our impedance data at high frequencies were fitted by Zview according to this equivalent circuit, where the depressed semicircles were simulated by the electrolyte resistance in parallel with a Constant Phase Element (CPE) that is generally a result of electrode roughness. The corresponding ionic conductivity was calculated from the resistance value according to the following formula:

$$\rho = \frac{R \times l}{S},$$

where ρ is the ionic conductivity, R is the resistance value in Ω, obtained by Zview fitting, l is the thickness of the pristine hydrated GO film in cm, and S is the cross-sectional area of the electrodes in $cm^2$. The calculated ionic conductivity is in S/cm.

4-Probe Electrical Measurement of a Pristine GO Film

To verify that GO is ionically conducting and electronically insulating, a 4-probe measurement with a Keithley SourceMeter (2410 C) was done on a single piece of GO film with 10 μm thickness. The spacing between each probe is 0.42 cm, and the lengths of those probes are 1.65 cm. The measured resistance in ambient condition was ~2.5 Mf (estimated conductivity was 1.0E-4 S/cm), and after the same film was kept in vacuum overnight (1E-5 Torr), the resistance increased to 9 GΩ (estimated conductivity was 2.8E-8 S/cm). At least three orders of magnitude change in resistance was observed under vacuum, suggesting that the major contribution to conductivity is ionic in GO.

The examples provided herein are to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

REFERENCES

Abraham, K. M., et al. "Highly conductive PEO-like polymer electrolytes," Chem. Mater. 1997, 9, 1978-1988 ("Abraham 1997").

Agmon, N., "The Grotthuss Mechanism," Chem. Phys. Lett., 1995, 244, 456-462 ("Agmon 1995").

Balducci. A., et al. "Cycling stability of a hybrid activated carbon//poly(3-methylthiophene) supercapacitor with N-butyl-N-methylpyrrolidinium bis(trifluoromethanesulfonyl) imide ionic liquid as electrolyte," Electrochim. Acla, 2005, 50, 2233-2237 ("Balducci 2005").

Cai, W. W., et al., "Synthesis and solid-state NMR structural characterization of $^{13}C$-labeled graphite oxide, Science, 2008, 321, 1815-1817 ("Cai 2008").

Casablanca. L. B., et al. "NMR-based structural modeling of graphite oxide using multidimensional $^{13}C$ Solid-State NMR and ab Initio chemical shift calculations." J. Am. Chem. Soc., 2010, 132, 5672-5676 ("Casablanca 2010").

Cerveny. S. et al., "Dynamics of Water Intercalated in Graphite Oxide." J. Phy. Chem. C, 2010, 114, 2604-2612 ("Cerveny 2010").

Chen, Y. et al., "High performance supercapacitors based on reduced graphene oxide in aqueous and ionic liquid electrolytes," Carbon, 2011, 49, 573-580 ("Chen 2011").

Chmiola, J. et al., "Monolithic Carbide-Derived Carbon Films for Micro-Supercapacitors," Science, 2010, 328, 480-483 ("Chmiola 2010").

Eda, G., et al., "Chemically derived graphene oxide: Towards Large-Area Thin-Film Electronics and Optoelectronics," *Adv. Mater.*, 2010, 22, 2392-2415 ("Eda 2010").

Eda, G., et al., "Large-area ultrathin films of reduced graphene oxide as a transparent and flexible electronic material," *Nat. Nanotech.*, 2008, 3, 270-274 ("Eda 2008").

Punckt, C., et al., "Electrochemical performance of graphene as effected by electrode porosity and graphene functionalization," *Electroanalysis.* 2010, 22, DOI: 10.1002/elan.201000367 ("Punckt 2010")

Gao, W., et al. "New insights into the structure and reduction of graphite oxide," *Nat. Chem.*, 2009, 1, 403-408 ("Gao 2009").

Gilje, S., et al. "A chemical route to graphene for device applications." *Nano Len.* 2007. 7, 3394-3398 ("Gilje 2007").

Hirata. M., et al. "Thin-film particles of graphite oxide, 2: Preliminary studies for internal micro fabrication of single particle and carbonaceous electronic circuits." *Carbon.* 2005, 43, 503-510 ("Hirata 2005"].

Hummers, W. S. et al., "Preparation of Graphitic Oxide," *J. Am. Chem. Soc.*, 1958, 80, 1339-1339 ("Hummers 1958").

Jung, I., et al. "Tunable Electrical Conductivity of Individual Graphene Oxide Sheets Reduced at 'Low' Temperatures." *Nano Letters*, 2008, 8, (12), 4283-4287 ("Jung 2008").

Kim, W. J., et al., "Sulfonated poly(ether ether ketone) membranes for electric double layer capacitors," *Electrochimica Acta*, 2008, 53, (12), 4331-4335 ("Kim 2008").

Liu, X. J. et al. "All-solid-state electric double-layer capacitor with isotropic high-density graphite electrode and polyethylene oxide/LiClO4 polymer electrolyte," *J. Electrochem. Soc.* 1996, 143, 3982-3986 ("Liu 1996").

Mauritz, K. A., et al., "State of understanding of Nafion," *Chem. Rev.*, 2004, 104, 4535-4585 ("Maritz 2004").

Macdonald, J. R., et al., *Impedance Spectroscopy Theory, Experiment, And Applications*, 2005 (John Wiley & Sons, Inc., Second ed., New Jersey) ("Macdonald 2005").

Park, S., et al., "Aqueous suspension and characterization of chemically modified graphene sheets," *Chem. Mater.* 2009, 20, 6592-6594 ("Park 2009").

Park, K. W. et al., "All-solid-state supercapacitor using a Nafion® polymer membrane and its hybridization with a direct methanol fuel cell," *J. Power Sources*, 2002, 109, 500-506 ("Park 2002").

Pech, D., et al., "Ultrahigh-power micrometer-sized supercapacitors based on onion-like carbon," *Nat. Nanotech.*, 2010, 5, 651-654 ("Pech 2010").

Pech. D. et al. "Elaboration of a microstructured inkjet-printed carbon electrochemical capacitor," *J. Power Sources*, 2009, 195, 1266-1269 ("Pech 2009").

Petit, C, et al., "Revisiting the chemistry of graphite oxides and its effect on ammonia adsorption. *J. Mater. Chem.* 2009, 19, 9176-9185 ("Perit 2009").

Rikukawa, M., et al., "Proton-conducting polymer electrolyte membranes based on hydrocarbon polymers," *Prog. Polym. Sci.*, 2000, 25, 1463-1502 ("Rikukawa 2000").

Saito. M.: Arimura, et al. "Mechanisms of ion and water transport in perfluorosulfonated ionomer membranes for fuel cells," *J. Phys. Chem. B*, 2004, 108, 16064-16070 ("Saito 2004").

Stoller, M. D., et al., "Graphene-based ultracapacitors," *Nano Lett.*, 2008, 8, 3498-3502 ("Stoller 2008").

Taberna, P. L., et al., "Electrode surface treatment and electrochemical impedance spectroscopy study on carbon/carbon supercapacitors." *Appl. Phys. A-Mater. Sci. & Proc.* 2006, 82, 639-646 ("Taberna 2006").

Thampan, T., et al., "Modeling of conductive transport in proton-exchange membranes for fuel cells," *J. Electrochem. Soc.*, 2000, 147, 3242-3250 ("Thampan 2000").

Tung. V. C. et al., "High-throughput solution processing of large-scale graphene." *Nat. Nanotech.* 2009, 4, 25-29 ("Tung 2009").

Wang, D. H., et al. "Ternary self-assembly of ordered metal oxide-graphene nanocomposites for electrochemical energy storage," *Acs Nano.* 2010, 4, 1587-1595 ("Wang 2010").

Wang, Y., et al., "Supercapacitor Devices Based on Graphene Materials." *Journal of Physical Chemistry C.* 2009, 113, (30), 13103-13107 ("Wang 2009").

Wei, Z., et al. "Nanoscale tunable reduction of graphene oxide for graphene Electronics," *Science*, 2010, 328, 1373-1375 ("Wei 2010").

Williams, G. et al.; "TiO2-graphene nanocomposites: UV-assisted photocatalytic reduction of graphene oxide." *Acs Nano,* 2008, 2, (7), 1487-1491 ("Williams 2008").

Xu, Y. X., et al., "Flexible graphene films via the filtration of water-soluble noncovalent functionalized graphene sheets, "*Journal of the American Chemical Society,* 2008, 130, (18), 5856 ("Xu 2008").

Zhang, Y. L. et al. "Direct imprinting of microcircuits on graphene oxides film by femtosecond laser reduction," *Nano Today,* 2009, 5, 15-20 ("Zhang 2009").

What is claimed is:

1. A method comprising the steps of:
   (a) selecting a graphite oxide membrane, wherein the graphite oxide membrane is a freestanding graphite oxide membrane;
   (b) forming a pattern on the graphite oxide membrane to form a patterned graphite oxide membrane, wherein the pattern is formed by reducing a portion of the graphite-oxide membrane to conducting reduced graphite oxide; and
   (c) forming a device that comprises the patterned graphite oxide membrane, wherein the step of forming the device comprises:
   cutting a pattern from tape, wherein the pattern of the tape is the same as the pattern of the patterned graphite oxide membrane, and
   operably affixing the tape to the patterned graphite oxide membrane, wherein the tape acts as a current collector.

2. The method of claim 1, wherein a laser is used to reduce the graphite-oxide membrane to conducting reduced graphite oxide.

3. The method of claim 2, wherein the laser is a $CO_2$ laser.

4. The method of claim 1, wherein the graphite-oxide membrane is reduced to conducting reduced graphite oxide using a technique selected from the group consisting of laser heating, controllable UV-irradiation, hot AFM tip scanning, and combinations thereof.

5. The method of claim 1, wherein the patterned graphite oxide membrane is a reduced graphite oxide-graphite oxide-reduced graphite oxide graphite patterned oxide inembrane.

6. The method of claim 1, wherein the patterned graphite oxide membrane has an in-plane geometry.

7. The method of claim 6, wherein the in-plane geometry is selected from the group consisting of column, concentric circle, and hairbrush geometries and combinations thereof.

8. The method of claim 1, wherein the patterned graphite oxide membrane has a sandwich geometry.

9. The method of claim 1, wherein the tape is selected from the group consisting of copper tape, polyvinyl tape, carbon-coated aluminum tape, and combinations thereof.

10. The method of claim 1, wherein the tape is a current collector tape.

11. The method of claim 1, wherein the tape is an electrical contact tape.

12. The method of claim 1, wherein the graphite oxide is prepared using a modified Hummers method.

13. The method of claim 1, wherein the device is operable for electrochemical performance without the use of any external electrolyte.

14. The method of claim 1, wherein the device is a supercapacitor device.

15. The method of claim 1, wherein the device is operable in a separator/electrolyte membrane system.

16. The method of claim 1, wherein the method is scalable.

17. The method of claim 16, wherein the method is scalable to write micro-supercapacitors on the graphite oxide.

18. The method of claim 1, wherein the method makes a two-dimensional pattern with a one-step laser-printing technique.

19. The method of claim 1, wherein the device is operable in an application selected from the group consisting of energy storage, energy storage capacitor, electronics, water purification, and combinations thereof.

20. The method of claim 1, further comprising the step of using the device in an application selected from the group consisting of an energy storage device, an energy storage capacitor, electronics, water purification, and combinations thereof.

21. A device comprising a patterned graphite oxide membrane, wherein the pattern on the patterned graphite oxide membrane is conducting reduced graphite oxide; and
   a patterned tape, wherein the patterned tape is the same pattern of the patterned graphite oxide membrane;
   wherein the tape is operably affixed to the patterned graphite oxide membrane; and
   wherein the tape acts as a current collector.

22. The device of claim 21, wherein the patterned graphite oxide membrane is a reduced graphite oxide - graphite oxide - reduced graphite oxide patterned graphite oxide membrane.

23. The device of claim 21, wherein the patterned graphite oxide membrane has an in-plane geometry.

24. The device of claim 23, wherein the in-plane geometry is selected from the group consisting of column, concentric circle, and hairbrush geometries and combinations thereof.

25. The device of claim 21, wherein the patterned graphite oxide membrane has a sandwich geometry.

26. The device of claim 21, wherein the tape is selected from the group consisting of copper tape, polyvinyl tape, carbon-coated aluminum tape, and combinations thereof.

27. The device of claim 21, wherein the tape is a current collector tape.

28. The device of claim 21, wherein the tape is an electrical contact tape.

29. The device of claim 21, wherein the device is operable for electrochemical performance without the use of any external electrolyte.

30. The device of claim 21, wherein the device is a supercapacitor device.

31. The device of claim 30, wherein the device is a micro-supercapacitor device.

32. The device of claim 21, wherein the device is operable in a separator/electrolyte membrane system.

33. The device of claim 21, wherein the device is operable in an application selected from the group consisting of energy storage, energy storage capacitor, electronics, water purification, and combinations thereof.

34. The device of claim 21, wherein the device is selected from the group consisting of energy storage devices, energy storage capacitor devices, electronic devices, water purification devices, and combinations thereof.

35. The device of claim 21 formed from the method of claim 1.

36. A method of using the device of claim 21 in an application selected from the group consisting of energy storage, energy storage capacitor, electronics, water purification, and combinations thereof.

* * * * *